Dec. 24, 1940.   S. CHINNICI   2,226,197
MACHINE FOR PRESSING SEAMED MATERIAL
Filed March 6, 1937   13 Sheets-Sheet 1

Inventor
Salvatore Chinnici
By Lloyd W. Patch
Attorney

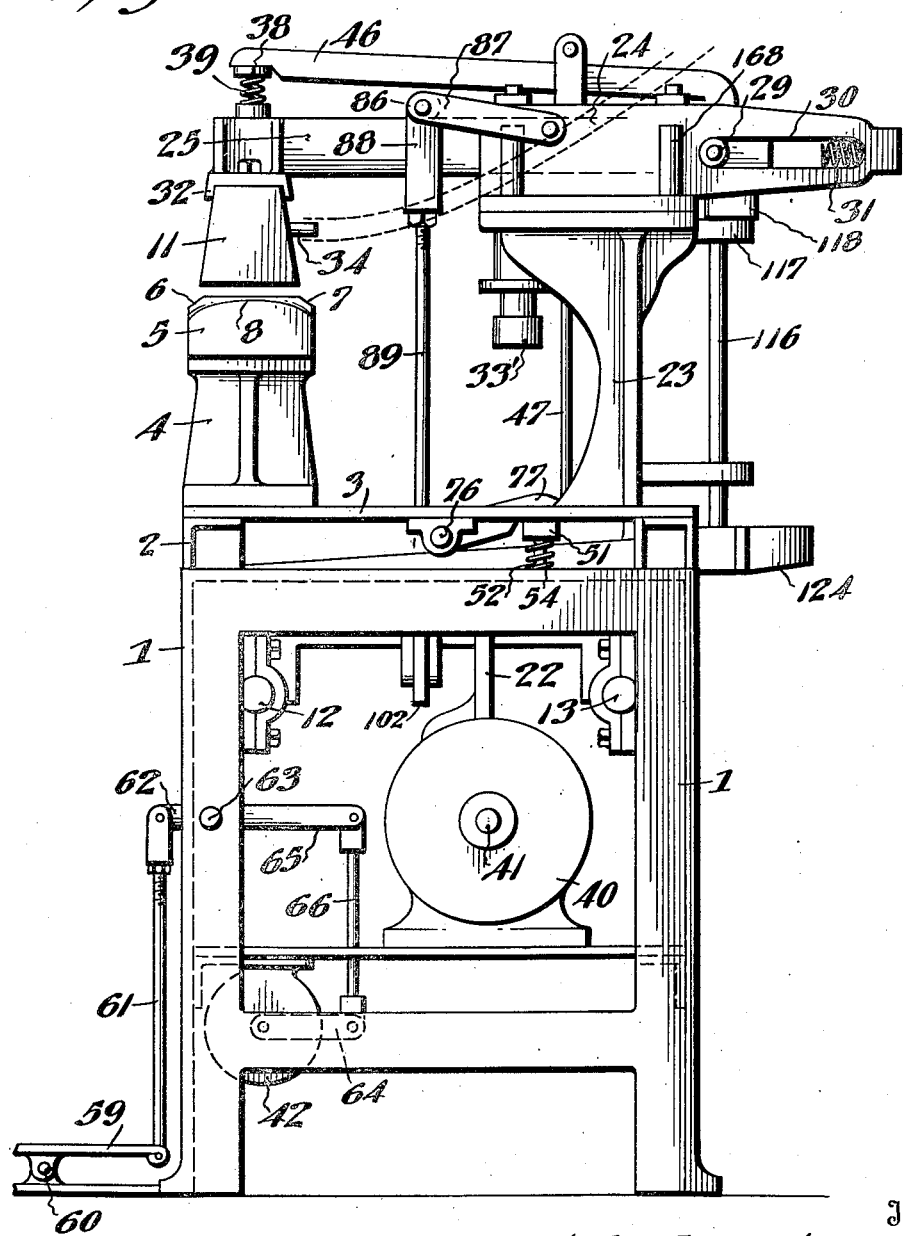

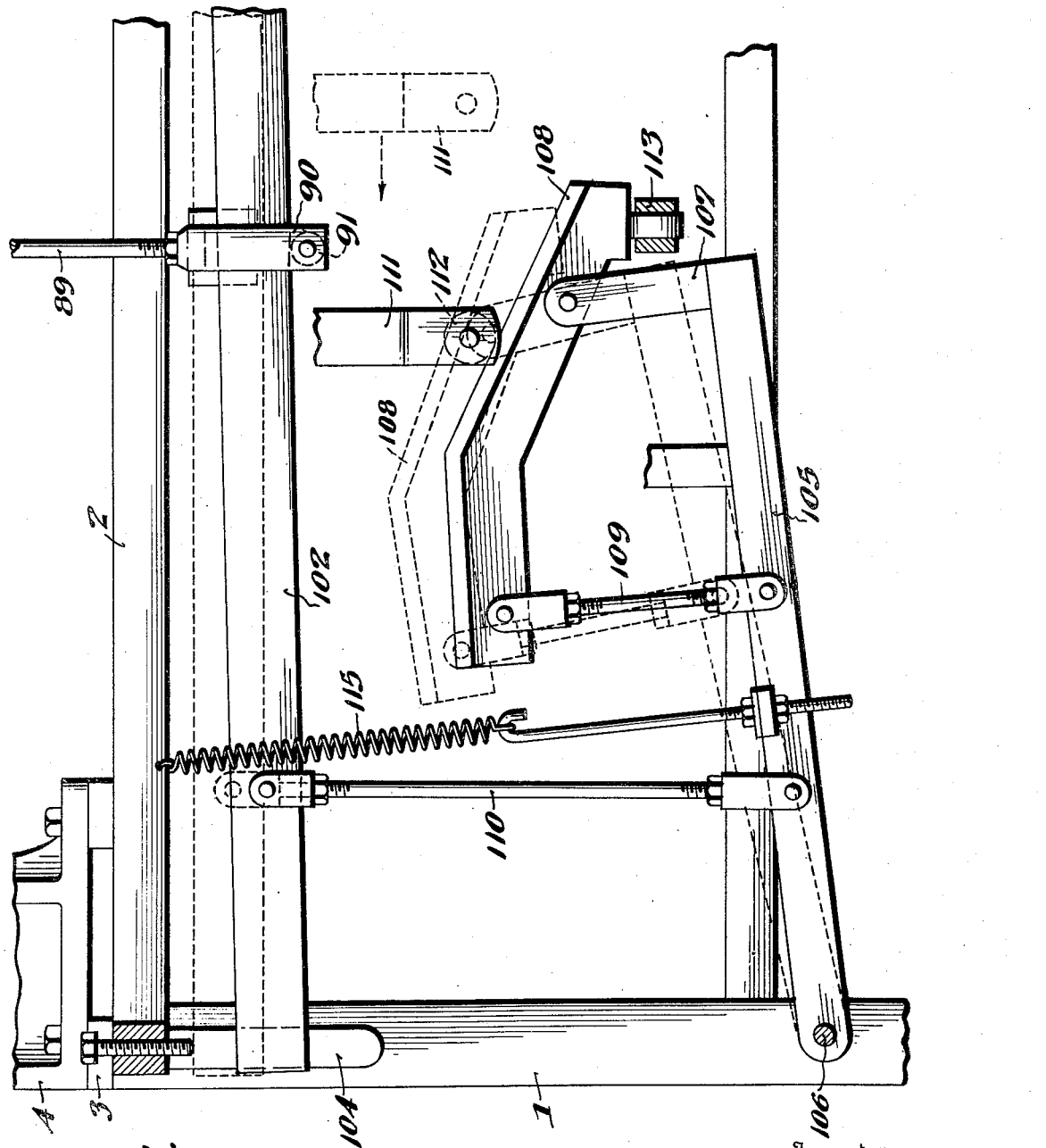

Dec. 24, 1940.   S. CHINNICI   2,226,197
MACHINE FOR PRESSING SEAMED MATERIAL
Filed March 6, 1937   13 Sheets-Sheet 4
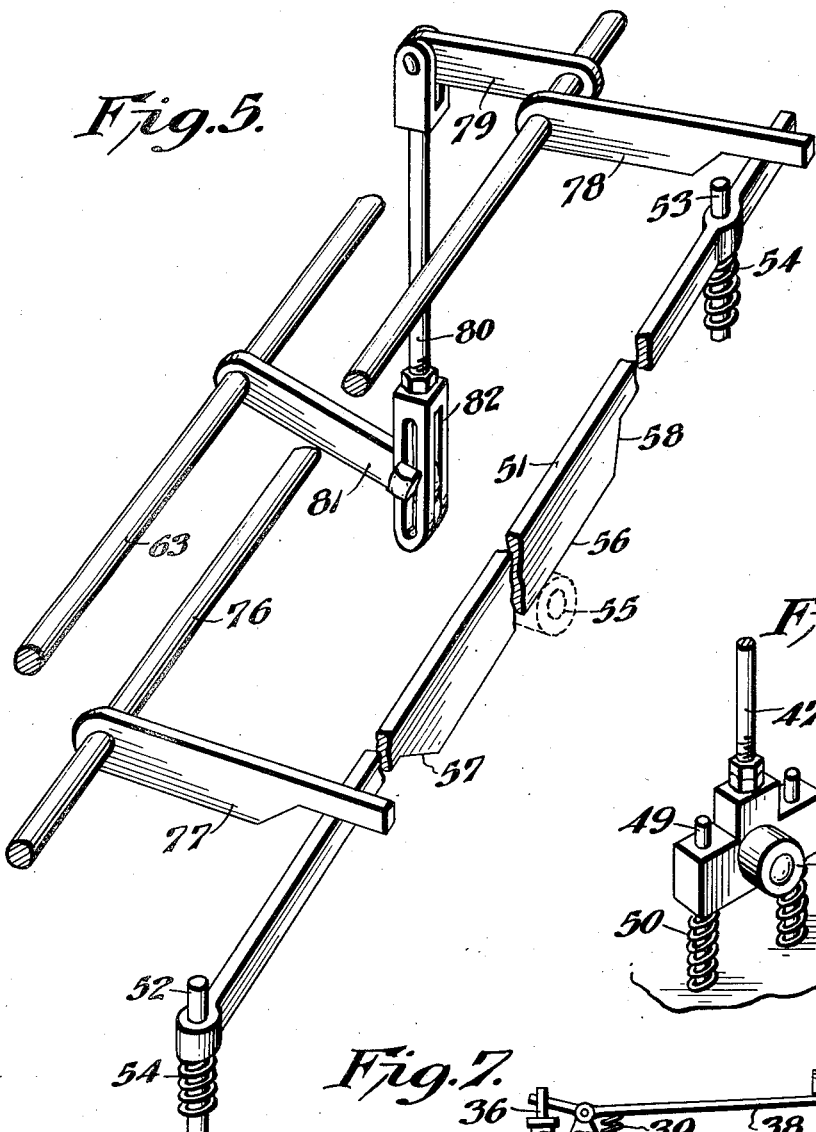
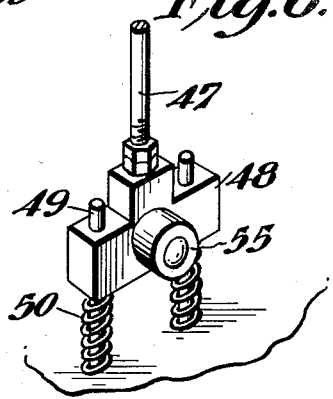
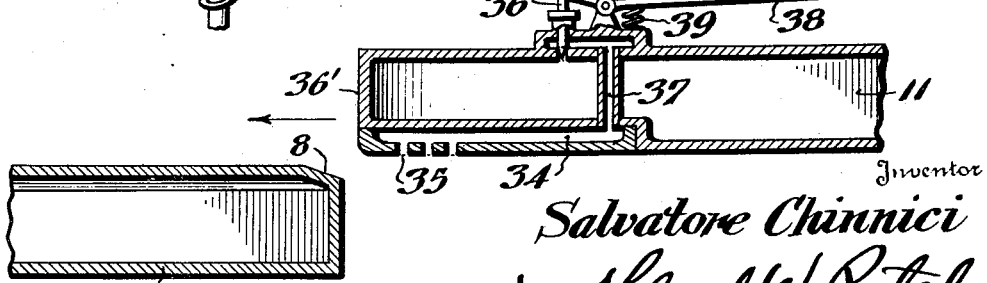
Inventor
Salvatore Chinnici
By Lloyd W. Pateb
Attorney Dec. 24, 1940.  S. CHINNICI  2,226,197
MACHINE FOR PRESSING SEAMED MATERIAL
Filed March 6, 1937   13 Sheets-Sheet 5
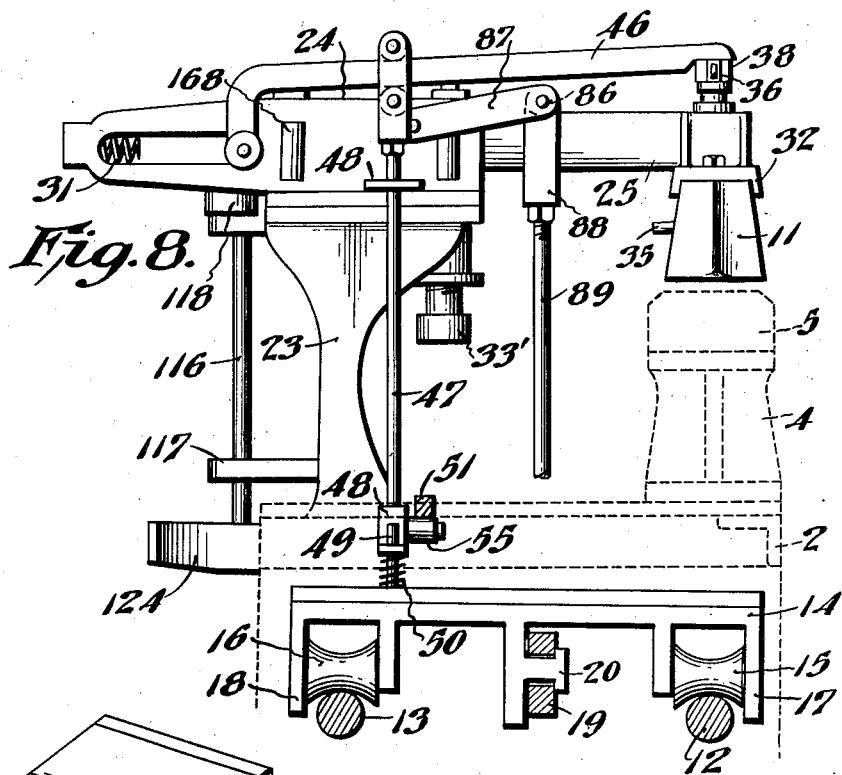
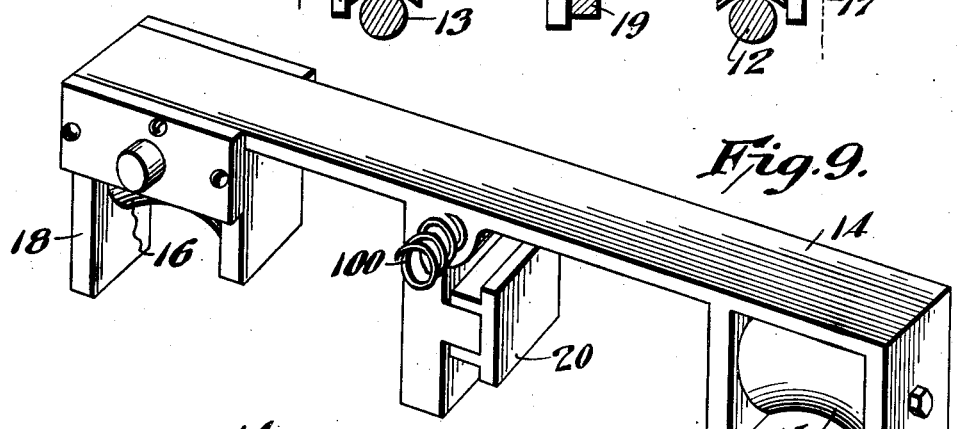
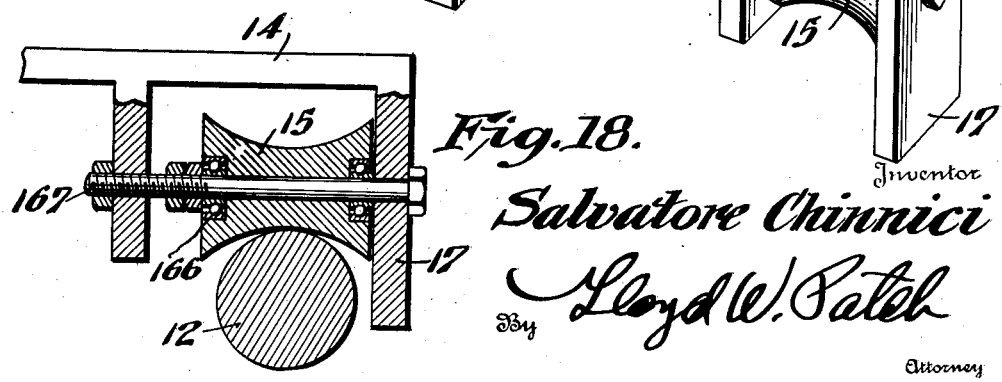
Inventor
Salvatore Chinnici
By Lloyd W. Patch
Attorney Dec. 24, 1940.  S. CHINNICI  2,226,197
MACHINE FOR PRESSING SEAMED MATERIAL
Filed March 6, 1937  13 Sheets-Sheet 6
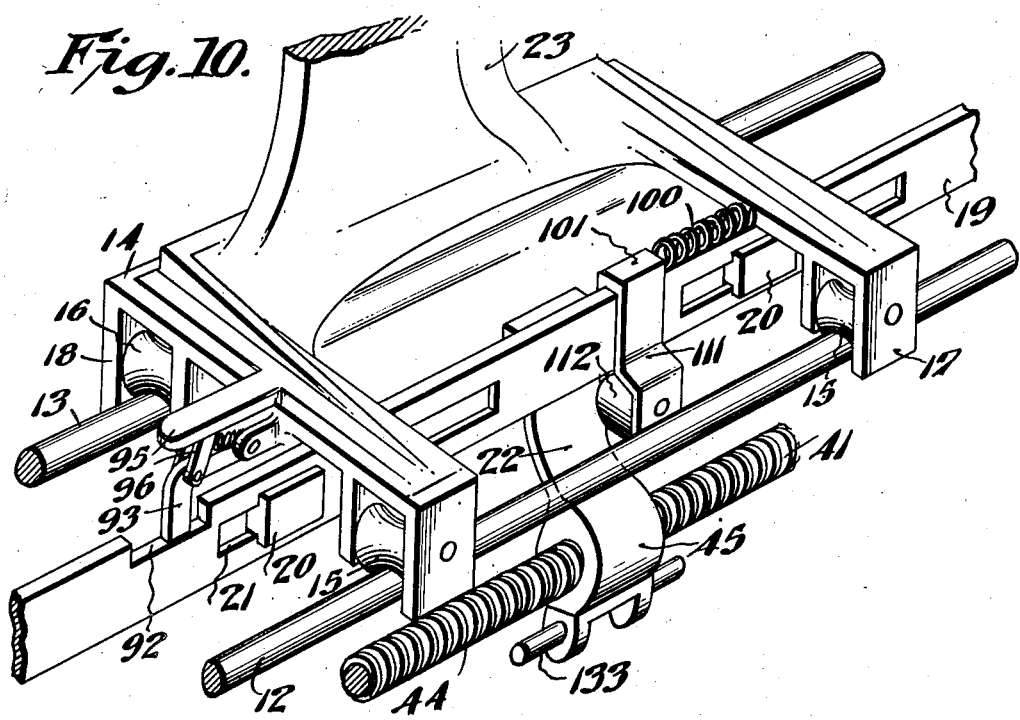
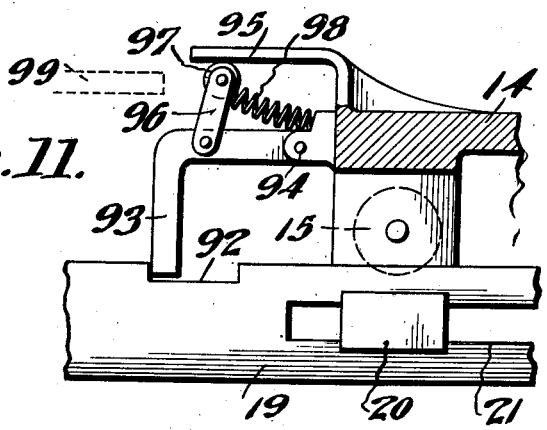
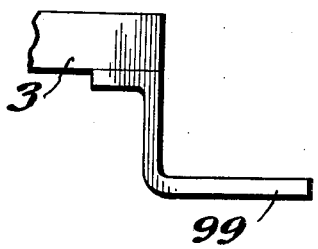
Inventor
Salvatore Chinnici
By Lloyd W. Patch
Attorney Dec. 24, 1940.  S. CHINNICI  2,226,197
MACHINE FOR PRESSING SEAMED MATERIAL
Filed March 6, 1937  13 Sheets-Sheet 7

Inventor
Salvatore Chinnici
By Lloyd W. Patch
Attorney

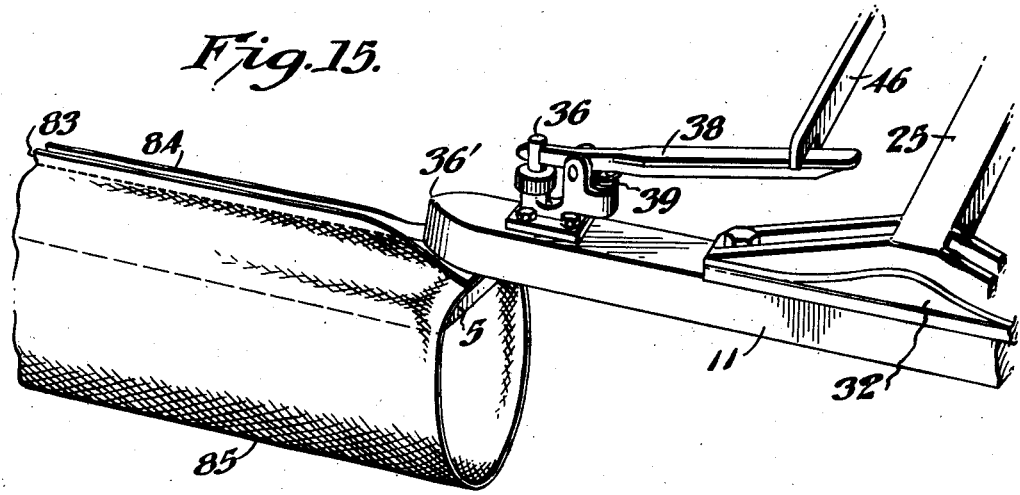
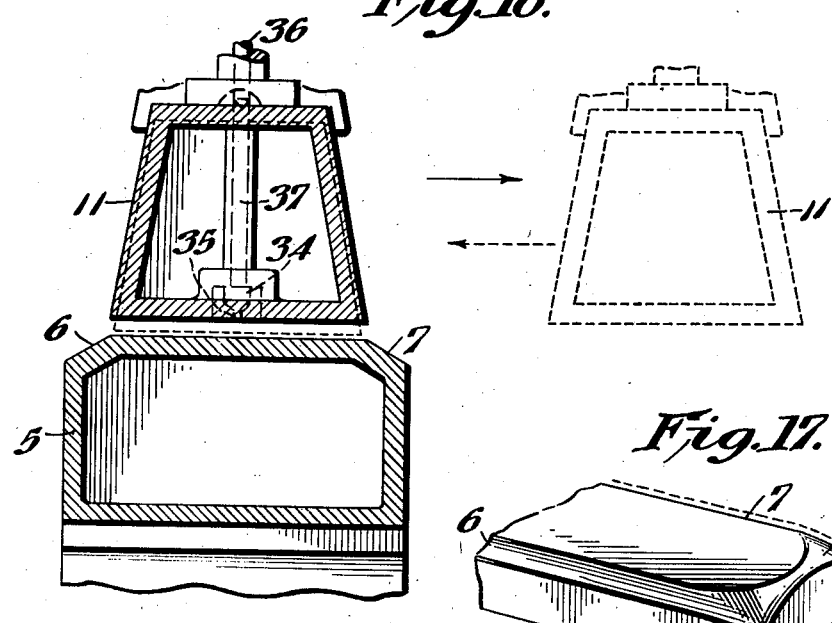
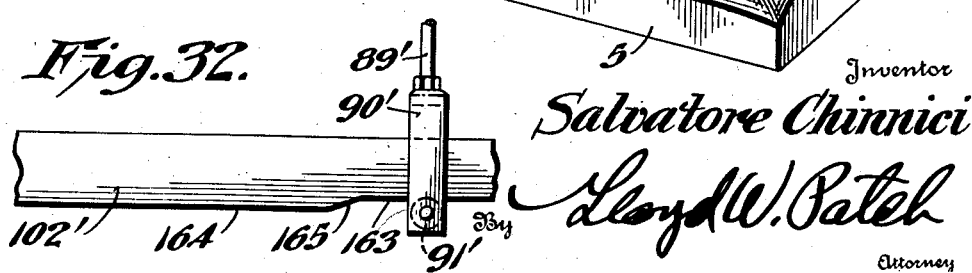

Dec. 24, 1940.  S. CHINNICI  2,226,197
MACHINE FOR PRESSING SEAMED MATERIAL
Filed March 6, 1937   13 Sheets-Sheet 9

Inventor
Salvatore Chinnici
By Lloyd W. Patch
Attorney

Dec. 24, 1940.   S. CHINNICI   2,226,197
MACHINE FOR PRESSING SEAMED MATERIAL
Filed March 6, 1937   13 Sheets-Sheet 10
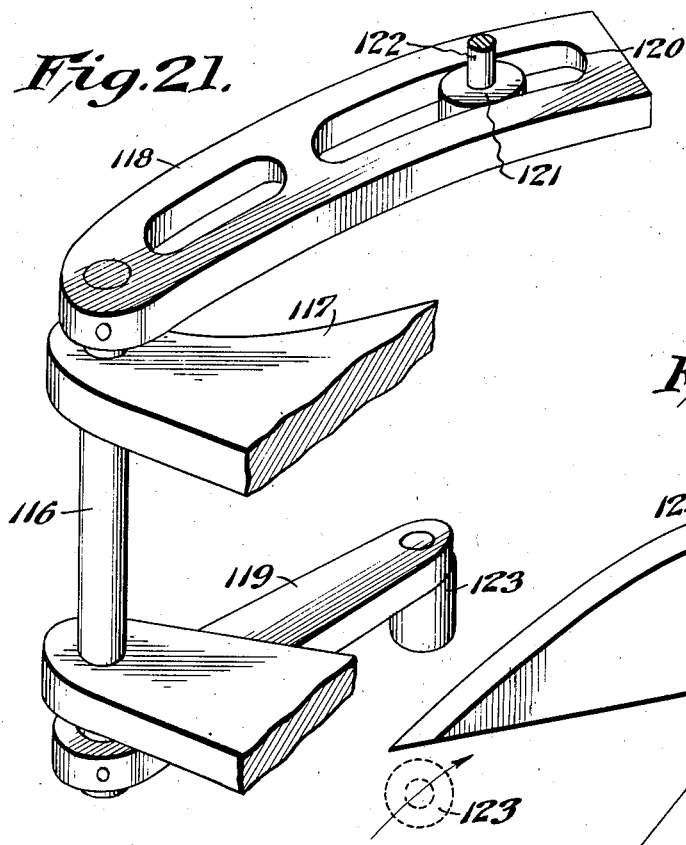
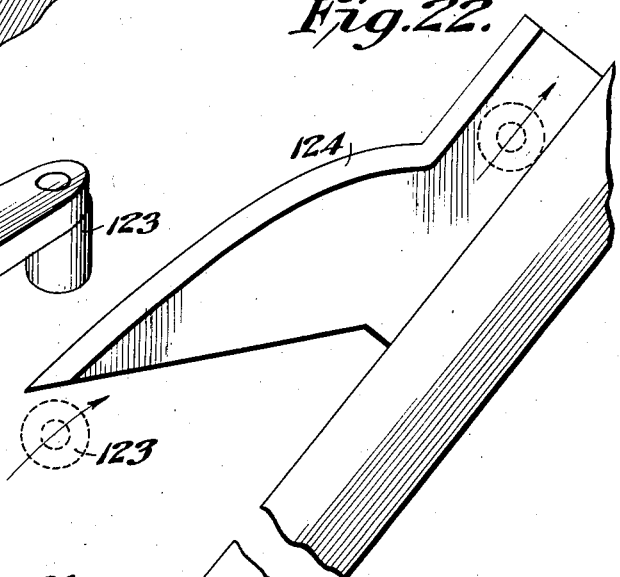
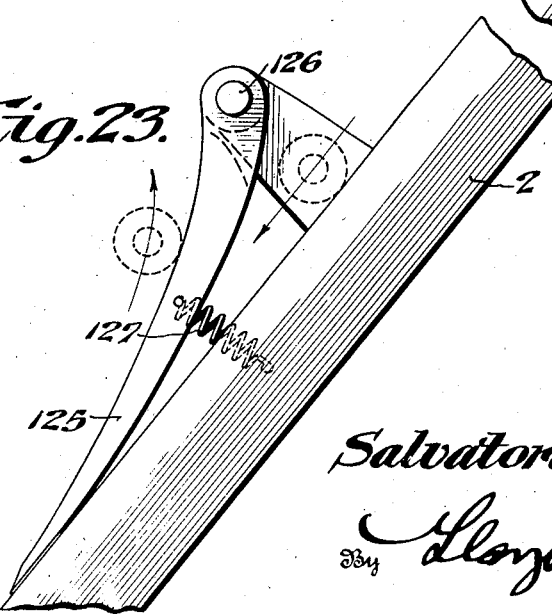
Inventor
Salvatore Chinnici
By Lloyd W. Patch
Attorney Dec. 24, 1940.  S. CHINNICI  2,226,197
MACHINE FOR PRESSING SEAMED MATERIAL
Filed March 6, 1937   13 Sheets-Sheet 11

Inventor
Salvatore Chinnici
By Lloyd W. Patch
Attorney

Dec. 24, 1940.  S. CHINNICI  2,226,197
MACHINE FOR PRESSING SEAMED MATERIAL
Filed March 6, 1937   13 Sheets-Sheet 12
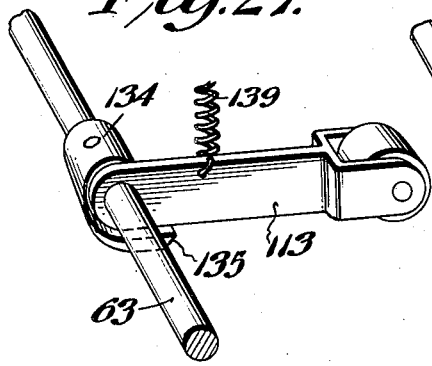
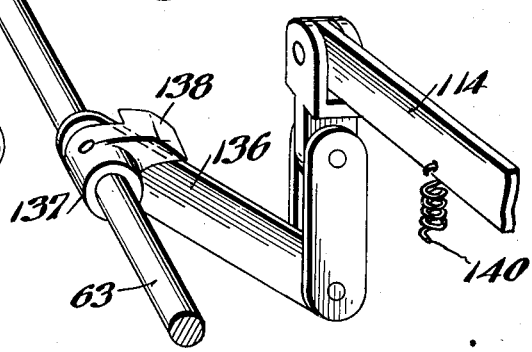
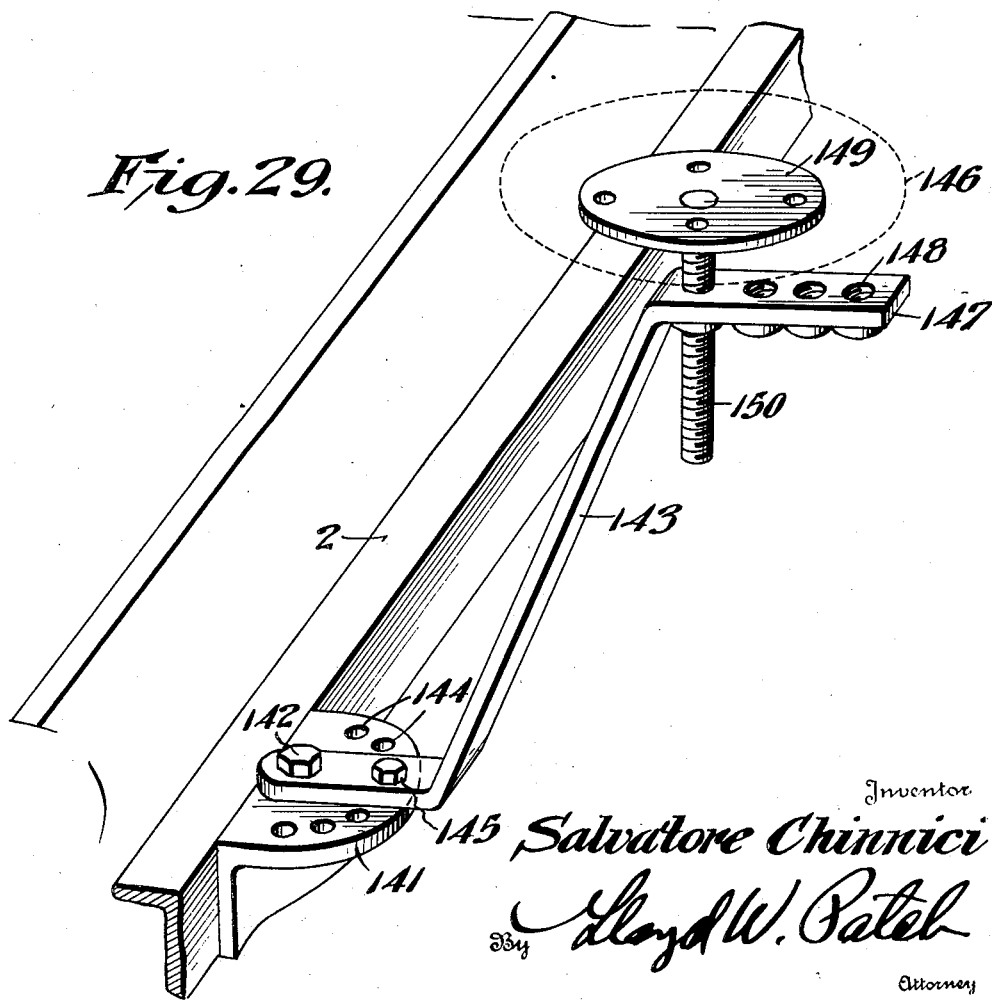
Inventor
Salvatore Chinnici
By Lloyd W. Patch
Attorney

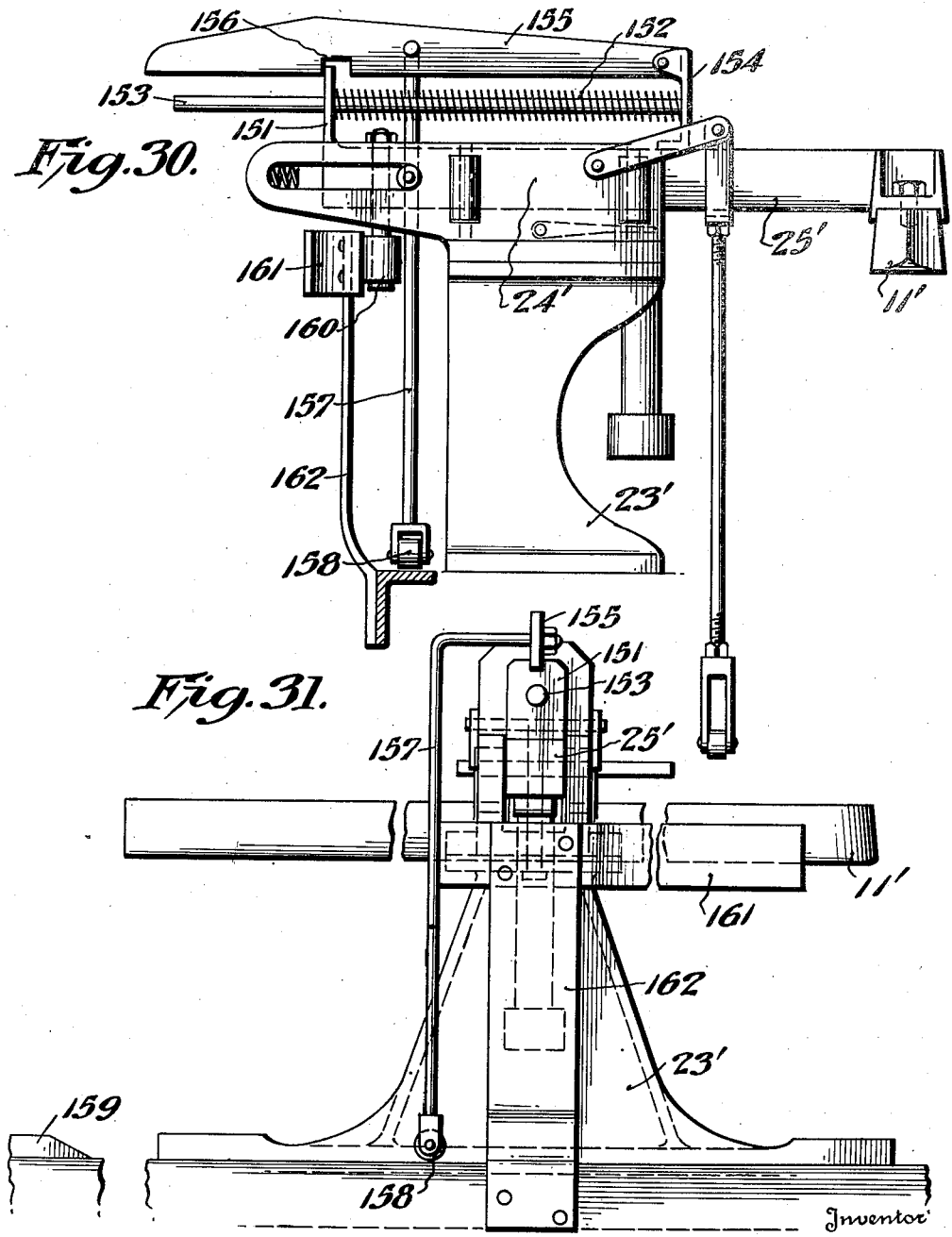

Patented Dec. 24, 1940

2,226,197

UNITED STATES PATENT OFFICE 2,226,197

MACHINE FOR PRESSING SEAMED MATERIAL

Salvatore Chinnici, Vineland, N. J.

Application March 6, 1937, Serial No. 129,494

14 Claims. (Cl. 38—31)

This invention pertains to a machine for pressing seamed material, my present invention relating particularly to means and a method adapted for use in opening and pressing and setting the seams of garments, such as the leg and waistband and other seams of trousers, sleeve seams of coats and other garments, longitudinal seams in coats and skirts and the like, and in fact in opening and pressing any substantially long and more or less straight seam in any garment or in any other piece of fabric or stitched or seamed material.

My present invention relates in part to a machine for and method of pressing seamed material, of the type set forth in my co-pending application serial No. 73,179, filed April 7, 1936, over which this application discloses improvements and extensions of the invention, in that provision is made for lateral removal of the pressing iron following the pressing operation.

An object of my present invention is to provide a pressing machine of this character which can be readily and efficiently operated and used by a single person, requiring only pedal manipulation for starting and stopping and for initiating removal and return movement of the pressing iron as the operation of the parts is substantially automatic; it being a purpose to incorporate foot actuated pedal control means so that the operator of the machine need not use either hand for machine control, but does have both hands free with which to manipulate and adjust the cloth or garment or fabric or material being worked upon over the work support or pressing buck, thereby reserving hand operations for placement and removal of the material or article, for smoothing of pockets and other portions of the garment or material, for straightening out transverse seams or belt loops or other parts incorporated in the seam or closely adjacent thereto, to thus save energy for the operator and greatly increase the production and efficiency of the machine, thereby saving time and energy and cost in the pressing operation.

Another object is to provide a machine and method of this character particularly useful and adaptable in finishing and pressing seams of newly made garments, and the like, where both hands of the operator must advantageously be free for handling and placement and manipulation of the garment or material, where rapid and efficient results are desired and required, and where the garment or material must be finished and pressed in new condition and without production or showing of shine or gloss at the pressed seam or upon any adjacent portion of the garment or material.

Yet another object is to so construct and associate and assemble the parts that the iron is moved progressively over the material to open and smooth the seam, the goods at the seam is moistened, and then the pressing pressure is applied directly and simultaneously throughout the length of the seam as thus opened and moistened, to thereby insure a smoothly pressed and uniformly set result.

Still another object is to so construct and associate the parts that the movement of the pressing iron to open the seam can be stopped and started as desired, to allow smoothing and adjustment of belt loops, watch pockets, cross seams, and other parts that might otherwise cause disarrangement of the material or unequal results in the finished pressing, and to provide a mechanism in which the iron holds the material in position on the pressing buck and automatically adjusts for any necessary differences in thickness of the goods or material, as for instance at transverse seams and the like.

A further object is to so construct and associate the parts of the machine, and the control mechanism therefor, that a single operator can use both hands in placing and handling and smoothing and manipulating the garment or fabric and the operation of the machine can be entirely and exclusively controlled by the use of the operator's foot, foot operation or control being also employed for starting and stopping the iron during the forward movement to open and smooth the seam, and hand operations or manipulations by the operator to control the machine being entirely obviated.

Still another purpose and object lies in the inclusion and the embodiment of interconnected and interfunctioning means and mechanism of such character that when operation is initiated the seam will be progressively opened and spread and smoothed, the material substantially along the line of the seam will be progressively moistened, and the pressing iron will be carried to a position extending over and along the length of the seam; and then, direct pressure will be automatically applied through the heated iron to dry and press the smoothed material without moving or sliding the pressing iron laterally over the material; the construction and arrangement and association of parts being such that the operator can then trip or release the parts for return movement and the iron will be instantaneously lifted from the pressing position and bodily removed from proximity to the material or garment without sliding the iron or moving the same laterally over the goods, and then the iron and other parts of the machine are returned or restored to the starting position.

Yet another object is to provide a machine of such construction that upon completion of the pressing operation, and tripping of the machine control, the iron is raised and is bodily shifted laterally from proximity to the pressing buck to entirely clear the buck and a garment or material thereon to thus permit free and ready removal and handling and placement of garments and material to be pressed, without interference from or contact with the pressing iron.

With the above and other objects and purposes in view, which will be apparent to those skilled in the art, or which are inherent in the construction and use of the parts and in the carrying out of my invention, this invention includes certain novel features of construction and combinations and arrangements of parts, and certain steps and procedures in the carrying out of the method, to be hereinafter more fully set forth in connection with the drawings, and then pointed out in the claims.

In the drawings:

Fig. 3 is an enlarged end elevational view looking from the right hand end of the showing in Figure 1.

Fig. 4 is an enlarged fragmentary view showing the pressing iron shift means in operative position and illustrating the released position in dotted lines.

Fig. 5 is a fragmentary perspective view showing the seam moistening control means.

Fig. 6 is a fragmentary view in perspective to better show the moistening valve control rod.

Fig. 7 is a broken fragmentary view in longitudinal section through the pressing iron and pressing buck illustrating these parts and the seam moistening control means.

Fig. 8 is a fragmentary sectional view through a portion of the upper part of the frame structure showing the lever arrangement for the steam moistening control mechanism.

Fig. 9 is a perspective view showing one of the wheel mounts for the carriage.

Fig. 10 is a broken fragmentary perspective view illustrating the carriage and the mounting of the iron supporting standard thereon.

Fig. 11 is a fragmentary side elevation of the releasable means by which the iron supporting standard is locked and fixed upon the carriage.

Fig. 12 is a detail view showing the trip to release the iron supporting standard from its locked fixed relation upon the carriage.

Fig. 15 is a perspective view showing the adjacent ends of the pressing iron and pressing buck and illustrating the relation of the parts when the seamed fabric is in place upon the pressing buck and the iron has been moved to initiate opening and smoothing of the seamed parts.

Fig. 16 is a fragmentary view in section showing the relative position of the pressing iron when over the pressing buck, and in dotted lines illustrating the position of the iron when bodily removed laterally from proximity to the pressing buck following the pressing operation.

Fig. 17 is a fragmentary perspective view showing the forward or outer end of the pressing buck.

Fig. 18 is a detail sectional view showing the construction and mounting of one of the carrying wheels of the carriage.

Fig. 21 is a fragmentary perspective view showing the iron shifting arm means.

Fig. 22 is an enlarged view showing the guide cam to operate the iron shifting means to return the iron to the starting position.

Fig. 23 is an enlarged plan view showing the iron shifting operating means whereby the parts are actuated to bodily move the arm laterally from proximity to the pressing buck.

Fig. 27 is a fragmentary perspective view to better show the operating arm by which the switch and the machine parts are set in neutral at the end of the forward movement of the carriage and iron.

Fig. 28 is a fragmentary perspective view illustrating the shift means by which the switch and machine parts are adjusted to the neutral position upon completion of the return movement of the carriage and iron.

Fig. 29 is a perspective view illustrating an adjustable movable seat to be used with my machine.

Fig. 30 is a view in side elevation of the upper portion of the machine illustrating a modified construction of pressing iron supporting parts.

Fig. 31 is a view in rear elevation of the showing in Fig. 30.

Fig. 32 is a fragmentary detail view illustrating a modified construction of pressure bar for the pressing iron.

Figure 1:
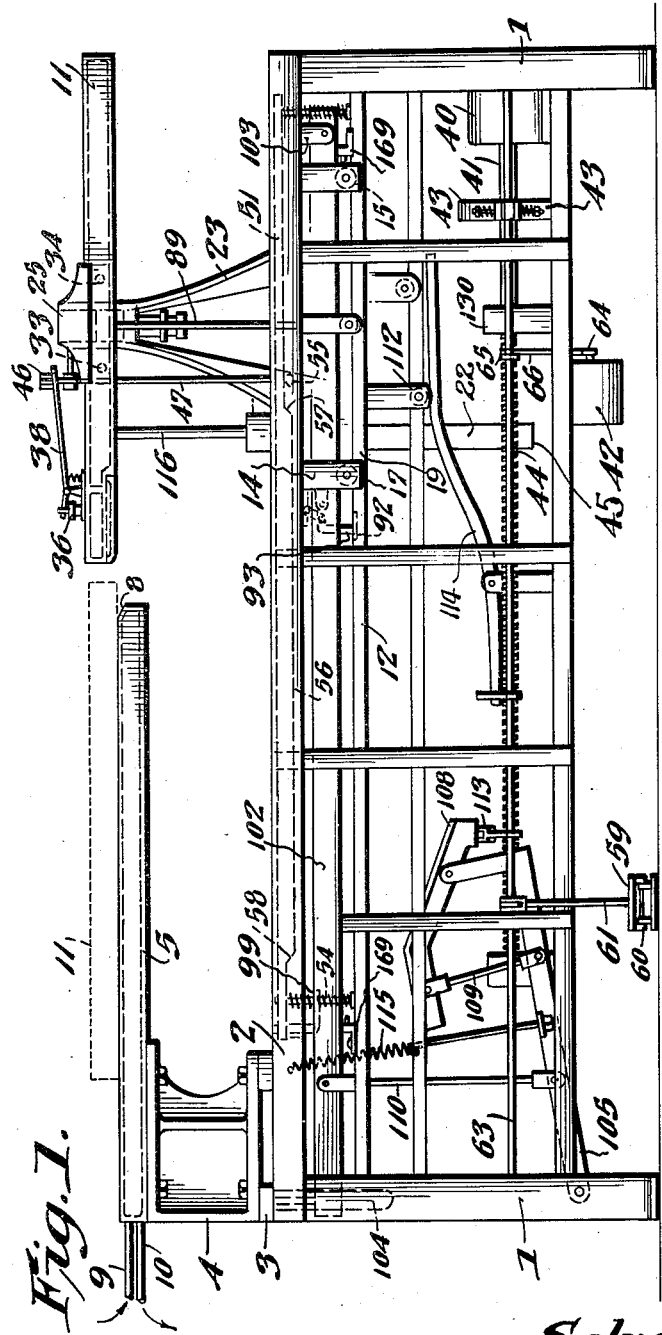
Figure 1 is a view in front elevation showing a machine embodying my apparatus and adapted for use in carrying out my method.

In the presently illustrated embodiment of my invention, the supporting frame structure is of substantially elongated rectangular shape or form when viewed in plan, and this frame and supporting structure can be made up or built of castings, angle iron or other shapes, or in fact can be constructed and erected in manner and form to best suit the particular requirements of use. In the drawings, the frame structure is disclosed as mounted or carried by supporting legs 1 and including the longitudinally extending bars 2 and transversely disposed connecting bars 3, and such other and necessary longitudinal and transverse and vertical members or frame portions as may be desirable and advantageous. In the present disclosure I have illustrated the frame structure and the several members thereof as being made up of usual forms, bars, angles, channels, and other standard shapes, but it will of course be borne in mind that the leg members can be cast or otherwise formed to be of any desired shape, and that the frame structure can be made up as a plurality of pieces fabricated together, as castings embodying several portions, or can be constructed and assembled in any desired manner that will serve the purposes of use.

Figure 1 shows in front elevation an embodiment of the complete machine or apparatus constructed in accordance with my present invention and adapted to carry out my improved method.

In this embodiment, a standard 4 is stationarily and rigidly mounted in upright relation at one end and adjacent to the forward side of the supporting frame structure, and upon this standard 4 an elongated pressing buck or support 5 is stationarily and rigidly mounted. This pressing buck is preferably made of hollow construction, as perhaps best shown in Figs. 16 and 17, and preferably has the top thereof flattened in its middle zone and beveled or rounded over at the side edges, as at 6 and 7. The nose of this pressing buck or support is preferably beveled or rounded, as illustrated at 8, in Fig. 17.

With this mounting of the pressing buck or support, the end thereof extends inwardly over the middle portion of the supporting frame and the disposition of the supporting standard 4 at one end leaves the other or inwardly extending end entirely free and unobstructed to be fitted through or receive a seamed garment or other piece of material, such as the leg of a pair of trousers, the sleeve of a coat, or in fact any other seamed garment or material that can be placed or located thereon with the seamed edges presented uppermost or outwardly. While it is intended that this pressing buck or support shall be heated and shall transfer heat to the material being pressed, to dry the same during the pressing operation or interval, the upper or pressing surface of this pressing buck or support can be fitted with a canvas cover, can be padded, or can be otherwise treated or covered to give a suitable and satisfactory pressing surface, without interfering with the transmission of heat. Inlet and outlet pipes 9 and 10 are provided at the end of the pressing buck or support 5 adjacent to the supporting standard 4, so that steam or other suitable heated fluid can be introduced or conducted into the hollow interior of the pressing buck for heating the same.

With the pressing buck or support constructed and mounted and connected in this manner, the body portion can be heated to any desired temperature, and due to the fact that the side and end edges are rounded, a garment or other seamed material can be placed thereon, substantially as shown in Fig. 15, and the end of the seamed portion can be drawn down over the rounded or reduced or inclined formation at 8 to thus present an open end of the seam, with the main portion of the seam extending substantially longitudinally and centrally upon the flat top of the pressing buck or support, and with the seamed edges of the material presented upwardly to thus be conveniently and fully available for opening and moistening and pressing of these seamed edges while the garment or material is supported and carried upon the pressing buck 5.

As set out above, the pressing buck 5 is stationarily mounted adjacent to the forward side and one end of the elongated supporting frame structure, and a pressing iron 11, also of elongated form, is provided to be manipulated and to travel and function relatively with respect to this positioning and mounting of the pressing buck. The pressing iron 11 must be moved to travel substantially along the length of the seamed portion of material supported on the pressing buck, to thus open and moisten the seam, must be capable of movement toward the pressing buck to accomplish the pressing operation, and is then desirably capable of movement upwardly and bodily laterally to be entirely removed from proximity to the pressing buck to permit free and ready and unobstructed placement and removal of the seamed material with respect to the pressing buck.

The supporting frame has supporting rods or tracks 12 and 13 extending longitudinally thereof in spaced relation, and these track members are preferably located adjacent to the forward and rear sides of the machine, and extend in a horizontal plane substantially parallel with the plane of the top of the pressing buck 5. A pressing iron carriage structure 14 has carrying wheels 15 and 16 mounted at opposite ends thereof to travel upon the track members 12 and 13 respectively Fig. 8. These track members 12 and 13 are conveniently made of metal bars of substantially cylindrical shape, and the carrying wheels 15 and 16 are grooved to travel upon and substantially conform to the upper sides of the track members 12 and 13. Side flanges 17 and 18 can be provided on the carriage 14 to positively prevent displacement of the carriage from the track members 12 and 13, if desired.

A bar 19 is mounted to extend substantially longitudinally upon the carriage structure 14, or in other words substantially parallel with the line of travel thereof, and this bar 19 is mounted for limited sliding movement relative to the carriage, guides 20 on the carriage being slidably received through slots 21 of the bar to maintain the bar in predetermined relation and to permit endwise movement only of said bar with respect to the carriage structure. A carriage propelling arm 22 depends from the bar 19, and through the medium of this arm 22 and the bar 19, the iron-supporting carriage 14 is moved and is propelled along and over the track or rail members 12 and 13, for both forward operative movement and return movement of the parts.

A pressing iron supporting standard 23 extends or is mounted in upright relation upon the carriage 14, so that it will travel between the longitudinal frame members 2 and will have a free path of travel in a line substantially parallel with but rearwardly of the line of extent of the longitudinal length of the pressing buck 5. This pressing iron supporting standard 23 is carried by and travels with the carriage 14. The iron-supporting standard 23 has its upper end extended forwardly and this upper end is widened out and is bifurcated to provide a guideway 24 extending substantially horizontally and at right angles to the direction of movement of the carriage 14 Fig. 19. A pressing iron carrying bar 25 is slidably mounted in this guideway 24, rollers being provided at 168 to lessen frictional contact laterally of said bar and permit more ready endwise sliding movement of said bar 25 in the guideway 24 Fig. 3. A roller 26 carried by swinging arm 27 is yieldingly held against the lower side of the pressing iron carrying bar 25, and the bar 25 is permitted to have swinging movement vertically at its outer end by reason of the fact that roller 29 carried by the bar 25 and mounted in slots 30 serves as pivot mountings for the bar 25. The slots 30 are elongated substantially horizontally to thus permit forward and back movement of the roller 29, as the bar 25 is moved forwardly and rearwardly in the guideway 24, and bumper springs 31 are provided in these slots 30 to definitely stop and cushion rearward movement of the bar 25 in the guideway 24. The hollow pressing iron 11 is mounted and carried on a suitable bracket structure 32 on the forward end of the bar 25, and due to the fact that the guideway 24 is slightly wider than the bar 25, and the fact that this bar is mounted for swinging and slight torsional movement, the iron 11 can move or swing upwardly and downwardly, can move bodily into a line substantially parallel with and above the pressing buck 5, can move to a position substantially parallel and above, but bodily and completely spaced rearwardly from the pressing buck when the bar 25 is slid rearwardly within the guideway 24, and can twist or move to have one end or the other thereof slightly elevated to clear and accommodate seams or other unevenness or variations in thickness in the material being pressed as the bar 25 is permitted slight torsional movement within the guideway 24.

The hollow pressing iron 11 has its lower pressing face shaped to substantially conform with the pressing face of the pressing buck 5, as to length and width, and thus a sufficient length and width of pressing area is provided relatively between the pressing iron and the pressing buck to press upon and cover the entire seamed edges and as much of the material on each side laterally from the seam as may be found desirable. As stated, the pressing iron 11 is made hollow, and inlet and outlet connections are provided at 33 and 34 to permit introduction of hot steam or of other fluid to attain and maintain a proper degree of heat in the body of the iron 11. It is perhaps desirable that flexible hose or other connections be made at 33 and 34, as these will not interfere with the movement and manipulation of the iron, and thus the iron can be heated to any desired temperature and free movement and manipulation thereof is not in any way hindered or interfered with. Of course, both the pressing buck 5 and the iron 11 can be heated in any desired or approved manner, as for instance by the use of electricity, a gas flame, or the like.

As stated, the spring 28 serves to resiliently hold the pressing iron carrying bar 25 swung upwardly, and in this position the iron 11 is swung upwardly with its pressing face in a plane above the plane of the pressing face of the pressing buck 5, as shown in Fig. 3 and illustrated by the full lines in Fig. 16. The spring 28, through the roller 26, serves to normally hold the pressing iron in this raised or elevated position, and as different conditions of use and operation may require different tension or bearing pressure through this spring 28, I provide an adjusting cap 33' available to the user or operator to vary and adjust the force exerted through or by the spring 28.

The pressing iron 11 is employed to open and smooth back the seamed edges of material placed or supported upon the pressing buck 5, to introduce or apply moisture along the line of the seam, and subsequently to exert pressure and to apply heat to press the opened and moistened material along the line of the seam. As shown in Fig. 7, the hollow pressing iron has a wet steam or moistening steam passage and chamber 34 near the forward end and adjacent to the lower face, and steam or moisture escape openings or passages 35 are provided through the pressing face of the pressing iron substantially centered and aligned longitudinally with the pressing face and nose of the iron. As the nose of the iron must enter between and spread out and smooth back the edges of the seamed material, as illustrated in Fig. 15, it is desirable that this nose be made somewhat wedge-shaped or pointed, as shown at 36'. Since steam or moisture will be applied only at certain times or intervals during the operation of the machine, and as steam is constantly supplied to the chamber within the hollow pressing iron 11, the moistening chamber 34 must be separated from the hollow opening in the body of the iron, and steam must be admitted to this chamber 34 only at certain intervals. To accomplish admission of steam, I provide a normally closed valve 36 in an inlet passage 37 establishing communication from the main body portion of the iron to the moistening or steam chamber 34. As stated, this valve will be normally closed through the agency of spring 39, or in any other suitable manner, and a handle or lever 38 is provided to be depressed when it is desired that the valve 36 be opened to allow flow of steam from the main hollow body of the iron through passage 37 into chamber 34, and consequently to permit escape of the steam through the moistening openings 35 to moisten or dampen the material to be pressed.

Since the carriage 14 is mounted on wheels 15 and 16 traveling on track members 12 and 13 and the iron 11 in its forward position is substantially centered axially and longitudinally with the pressing buck 5, it will be seen that the travel of the carriage 14 will move the iron in a path over and above the pressing buck 5. Through the rocking movement permitted in the arm 25, the iron 11 can be lowered to bear and press against the pressing buck 5, as shown by the lower dotted lines in Fig. 16, and through the endwise or longitudinal movement permitted in the bar 25, the pressing iron 11 can be moved laterally and bodily to be completely separated from and out of proximity to the pressing buck 5, as indicated by the dotted line position shown at the right hand in Fig. 16.

A motor 40, receiving current from any suitable source, or any other desired and suitable power unit, is mounted upon the frame structure and is provided with a drive or propelling shaft 41. A control and reversing switch, generally indicated at 42, is provided for the motor, and a brake 43 is associated with the drive or propelling shaft 41. This drive or propelling shaft has a major portion thereof extending longitudinally of the frame and substantially in line with the carrying or propelling arm 22 on the bar 19, and this portion of the shaft 41 is externally screw threaded, as at 44 Fig. 10, the threaded portion being preferably provided with a square thread having a long pitch. The propelling or carrying arm 22 on the bar 19 has an internally screw threaded nut portion 45 fitted upon the screw threaded portion 44 of shaft 41. The motor 40 can be selected to have a speed relatively proportioned to the pitch of the screw threaded portion 44, and as this motor is of the reversible type, it will be appreciated that shaft 41 can be rotated in the one direction to move or propel the carriage 14 from right to left along the tracks 12 and 13, and can be rotated in the opposite direction to cause return movement of the carriage 14 from left to right. Obviously, any desired speed of travel can be accomplished by variations in the speed of the motor selected, or by variations in the pitch of the screw threaded portion 44 of the shaft 41. As stated, the motor or power unit 40 is of the reversible type and the switch 42 is also of such construction that the motor can be started in forward rotation, can be stopped in neutral position, and can be started in reverse rotation, the brake structure at 43 being of such construction that it will function efficiently to stop rotation of the shaft in either forward or reverse direction, when the switch 42 is thrown to neutral, and will permit rotation of the shaft in either forward or reverse direction when the switch 42 is correspondingly set.

The forward movement of the carriage 14 is to be accomplished with the pressing iron 11 raised to be spaced above the top of the pressing buck 5, substantially as illustrated in Fig. 16, so that as the seamed material is placed and supported upon the pressing buck 5 and the pressing iron 11 moves longitudinally along the length of the pressing buck, the two upstanding edges of the seamed material will be opened or spread back, as shown in Fig. 15, and these edges will be smoothed down against the main portions of the material on each side of the seam. As indicated in Fig. 16, the moistening openings 35 are so located that they will substantially center upon the line of stitching between the seamed edges of the material, and consequently as steam escapes through these openings 35 the material will be moistened along the line of the seam. Wet steam is used, and the steam escaping under pressure through the openings 35 will penetrate the material to moisten the fabric and the yarn or thread thereof, and the degree and quantity of moistening can be regulated and varied by providing a greater or lesser number of steam escape openings. Further, should it be desired to moisten the material over a wider area, the openings 35 might be made as slots, can be staggered or spread laterally, or can be arranged or formed in any other desired manner, such construction being well within the knowledge of one skilled in the art and therefore not being here particularly illustrated.

As has been stated, it is desirable that steam escape through the openings 35 to moisten the material only during forward travel of the pressing iron and while the seamed edges are being spread and smoothed, and such control is accomplished through the valve 36 and arm 38. An adaptable steam control means is illustrated in Figs. 5, 6 and 8. An arm 46 is swingably mounted on the upper part of the pressing iron supporting standard 23, and this arm has its outer end extended to rest upon the outer end of lever or valve operating arm 38, upon depression of which the steam valve 36 is opened to admit steam to escape through the moistening openings 35. A draw link 47 is slidably mounted through a bearing 48', and is bifurcated at its upper end to fit around and over the arm 46 at a point spaced between the pivotal or swinging mounting of this arm and the point of contact of arm 46 and lever 38. Rollers can be provided, as shown in Fig. 8, in the bifurcated portion of the link 47 to reduce friction on arm 46. At its lower end this draw link 47 has a cross head 48 slidably received on pins 49 extending upwardly from the carriage structure 14. These pins 49 have springs 50 thereon normally exerting resilient pressure against the crosshead 48 to push up the link 47 and consequently raise the arm 46, which allows spring 39 to swing up the arm or lever 38 and thus close the moistening steam control valve 36.

A steam control bar 51 is disposed longitudinally upon the frame and is slidably mounted at its ends on upright pins 52 and 53, which pins are carried by the supporting frame structure. With this mounting, the control bar 51 is bodily movable upwardly and downwardly on pins 52 and 53, and coil springs 54 are provided around the lower portions of the pins 52 and 53 to normally exert pressure to raise the bar 51. This bar 51 is disposed to be closely adjacent to the path of movement of the crosshead 48, as the carriage 14 is moved or propelled longitudinally upon the frame, and the crosshead has a bearing roller 55 extending laterally therefrom to travel beneath the lower edge of the bar 51. This steam control bar 51 has the middle portion thereof widened downwardly, as at 56, and this widened portion has its ends tapered as at 57 and 58.

Figure 13:
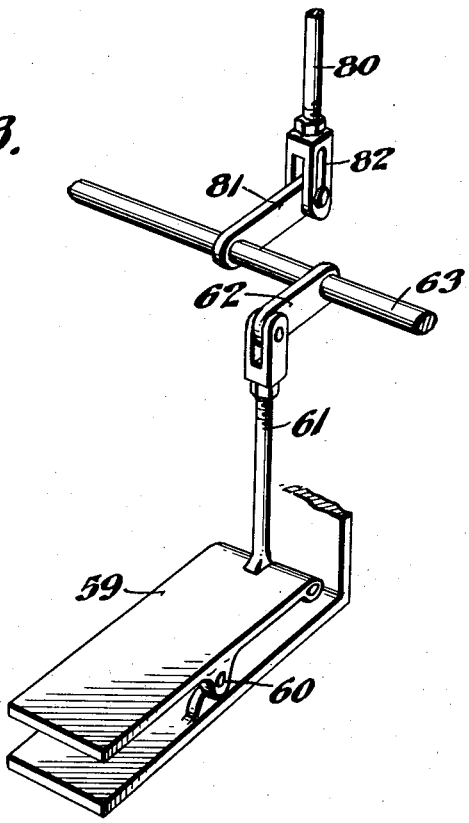
Fig. 13 is a perspective view showing the foot actuated control pedal and interconnected parts of the operating and control linkage and leverage.

A foot treadle 59 Figs. 3, 13, is provided at a convenient point on the forward side of the frame, and is located to be accessible to the foot of an operator when standing in position to readily place and handle seamed garments or fabrics or material upon the pressing buck 5. This foot treadle is pivoted or swingably mounted at 60, to thus be capable of rocking movement both upwardly and downwardly, at its inner end, the foot treadle being consequently of the double acting type. This foot treadle has a link 61 at its inner end pivotally connected with an arm 62 on a control shaft 63. This control shaft 63 is journalled in suitable bearings to extend along the frame and adjacent to the switch 42 and the brake 43, and is adapted to be the primary control for the operation of the machine. Through the medium of this foot tradle 59, the shaft 63 can be rocked in either direction, as may be desired, and in consequence control for forward and reverse operation of the machine can be accomplished through manipulation of the single foot treadle 59. The reversing switch 42 has a control arm 64 thereon adapted to be swung to adjust the switch to forward and reverse settings, and the arm 65 on the shaft 63 is connected with the switch arm 64 through a link 66. By this connection, when the foot treadle 59 is in the intermediate position the switch will be set in neutral, and in each of the other two positions of the foot treadle the switch will be either set for forward or reverse connection and operation of the motor or power unit 40.

Figure 14:
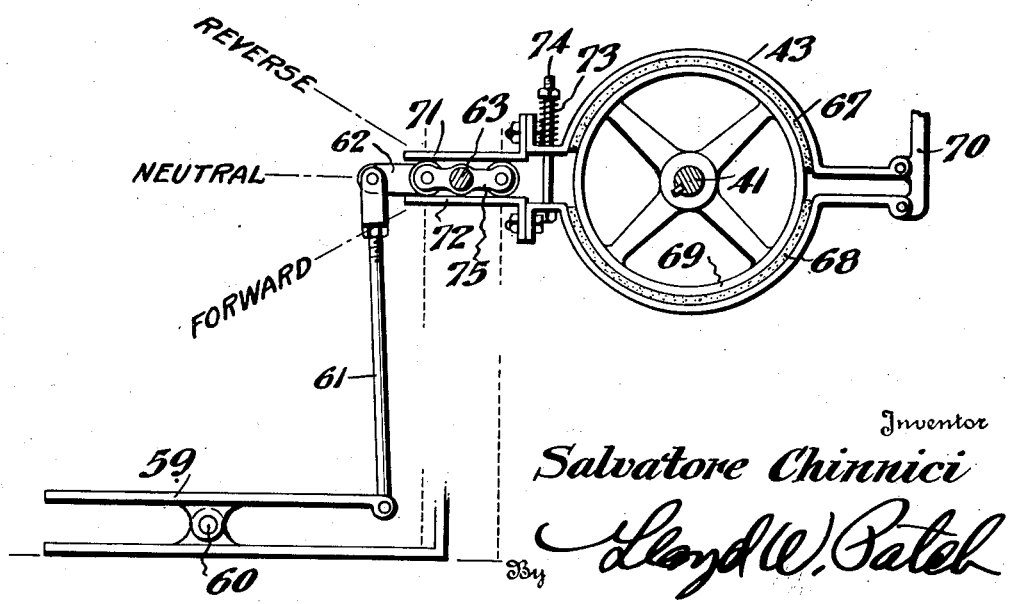
Fig. 14 is a fragmentary view in elevation, and partly in section, to show the foot actuated control mechanism and the brake means.

As perhaps best shown in Fig. 14, the brake structure 43 is of the double shoe external type, the two shoe portions 67 and 68 being adapted to bear on opposite sides of a brake drum 69 keyed or otherwise fixed on the operating or propelling shaft 41. These shoe members are pivotally or swingably mounted at one side on a suitable bracket or supporting structure 70, and are adjustably connected with extension arms 71 and 72. A coil spring 73 fitted upon a pin 74 passing through openings in the free swinging ends of the brake shoe members 67 and 68 normally exerts resilient force to bring said brake shoe members into frictional braking contact with the brake drum 69, and to release the brake shoes from operative position it is necessary to swing these ends of the brake shoes outwardly against the force of the spring 73. The extension arms 71 and 72 project on opposite sides of a portion of the control shaft 63, and a double acting cam 75 is keyed or otherwise fixed upon the shaft 63 between the extension arms 71 and 72, so that as the foot treadle 59 is operated to oscillate or impart a partial rotation to the control shaft 63, the extension arms will be spread to separate the brake shoes 67 and 68 from frictional contact with the brake drum 69. By the adjustment of the arms 71 and 72, it is possible to vary the frictional bearing force exerted by the brake shoes 67 and 68 against the brake drum 69, during the braking operation. When the foot treadle 59, the control shaft 63, and parts controlled thereby are in neutral, the double acting cam 75 will be in the position illustrated in Fig. 14, and the spring 73 will close the brake shoes 67 and 68 to bear frictionally upon the brake drum 69 and hold the shaft 41 against rotation. When the treadle 58 is actuated to accomplish either forward or reverse actuation and control, the double acting cam 75 will bear against and between the extension arms 71 and 72, in consequence of which the brake shoes 67 and 68 will be spread or moved away from brake drum 69 to permit free rotation of the shaft 41, the direction of rotation of this shaft 41 being of course dependent upon the particular direction of manipulation of the treadle 59, and consequently the setting of the switch 42.

The forward travel of the carriage 14 moves the pressing iron 11 forward longitudinally above and substantially parallel with and over the pressing face of the pressing buck 5, and as it is desired to avoid severe rubbing pressure upon the garment or material being pressed, it is desirable that the face of the pressing iron be at all times during this forward travel sufficiently spaced above the face of the pressing buck to avoid pressing contact with the material. Thus, when a garment or other seamed material is placed upon the pressing buck 5, with the seamed edges uppermost, as shown in Fig. 15, the seamed portion of the material can be drawn down over the end 8 and after the operator has initiated the opening and spreading back of the seamed edges, the substantially wedge-shaped or pointed end 36 of the pressing iron 11 will continue on between the seamed edges, in substantially the relation illustrated in Fig. 15, and these seamed edges will be opened out and smoothed back to lie against the material on each side of the line of seaming.

It is desirable that the steam supply to the steam escape openings 35 be established substantially as the pressing iron 11 reaches the garment or material, and as the steam valve 36 is opened through pull exerted upon the rod 47, it is necessary that the steam control bar 51 be sufficiently lowered against the pressure of springs 54 to engage the roller 55 and thus exert the required pulling pressure upon link or rod 47. Pulling force exerted upon this link or rod 47 will of course move or swing downwardly the arm 46 to depress arm 38, which arm in turn opens the moistening steam control valve 36.

Normally, the steam control rod or bar 51 is raised by the springs 54 above the position in which the roller 55 will be engaged to exert pulling force upon rod or link 47 to open the moistening steam control valve, and it is therefore necessary that means be provided to lower this control rod or bar 51 when the carriage 14 starts on its forward movement, so that as the pressing iron 11 reaches the proper relative position with respect to the pressing buck 5, moistening steam will be discharged through the openings 35; and, at the same time it is desirable that the steam supply through the openings 35 be cut off at the forward end of the travel of the iron 11 over the pressing buck 5, and that the valve 36 be maintained closed during return movement of the pressing iron to its starting position for a new operative cycle. With this in mind, I provide adjacent to the rod or bar 51, a shaft 76, which is journalled longitudinally upon the frame structure. Arms 77 and 78 are provided to extend laterally from this shaft 76 and have their outer ends disposed to bear upon and against the upper side of the rod or bar 51. The shaft 76 has an operating arm 79 extending radially therefrom, and a push rod or link 80 is connected at its one end with the swinging end of this arm 79, and at its remaining end is connected with the swinging end of an arm 81 carried by the main operating shaft 63. The push rod or link 80 has a slotted connecting member 82, by which connection is established with the end of arm 81, and thus as the treadle 59 has its forward end swung downwardly to set the parts for forward movement of the carriage 14, this arm 81 is swung upwardly and through the push rod or link 80 the shaft 76 is given oscillatory movement to swing the outer ends of arms 77 and 78 downwardly and thus depress the rod or bar 51 so that this rod or bar is moved to a position that will engage the roller 55 and will consequently open the moistening steam control valve. The shoulder 57 of rod or bar 51 is located at a point to cause opening of the valve 36 at the proper interval, and the straight run or portion 56 of the rod or bar 51 will maintain this valve open during the forward moistening travel of the pressing iron 11. When the pressing iron approaches its point of stopping at the end of the forward travel, the roller 55 will run over the shoulder 58, in consequence of which the pulling pressure on the draw rod 47 is released and the valve 36 is then free to close over the force of spring 39. Due to the loose connection of the arm 81 with the push rod or link 80, at 82, the foot treadle 59 can be swung to raise the forward end and the parts can thus be set in reverse position, without in any way affecting or acting upon the moistening steam control means. Thus, for the return travel or movement of the carriage and the iron, the roller 55 will not be engaged by the bar or rod 51, and accordingly the moistening steam control valve 36 will remain closed.

With the parts constructed and assembled and operating as set forth above, the pressing iron will be moved forwardly from the position shown in Fig. 15, to open out the seamed edges 83 and 84 of the trousers leg or other garment or fabric portion 85, and smooth these down to lie against the main portion of the material on each side of the line of seam. At the same time, moist steam is discharged or supplied through the openings 35 to moisten the material along the line of the seam, the heat of the pressing iron 11 dissipating this moisture to penetrate the material and prepare the same for final pressing and drying.

As has been stated, the pressure exerted by iron 11 during this forward travel to open and moisten the material along the line of the seam is not sufficient to accomplish pressing of the material, and this final pressing and drying of the garment or material is accomplished in a single operation throughout substantially the entire length of the opened and moistened seam, and by direct pressure exerted between the pressing iron 11 and the pressing buck 5, as distinguished from sliding or rolling or other pressing of a moving part. In other words, my machine and method contemplate the application and exertion of direct pressing force through the iron 11 at substantially one and the same time or instantaneously throughout substantially the entire length of the opened and moistened seam, the heated pressing iron being used to exert this pressing force and to dry the material as held and supported upon the pressing buck, without lateral or endwise or other movement of the pressing iron during the pressing interval. This direct application of pressing force to and through the pressing iron is accomplished by rocking the arm 25 around its swinging mounting at 29, to thus lower the pressing iron 11 toward and to cause direct pressing pressure upon the material supported by the pressing buck 5, this pressing position being illustrated by the lower dotted lines in Fig. 16.

Figure 19:
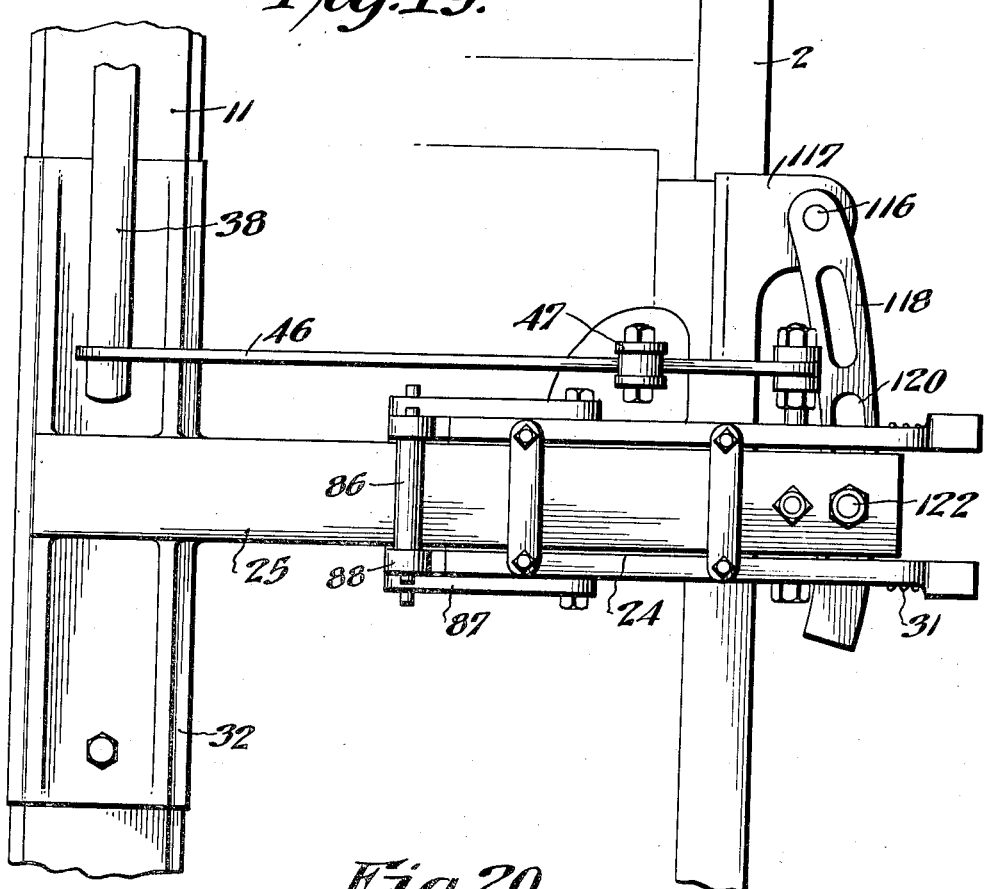
Fig. 19 is a top plan view to better show the iron supporting mounting.
Figure 20:
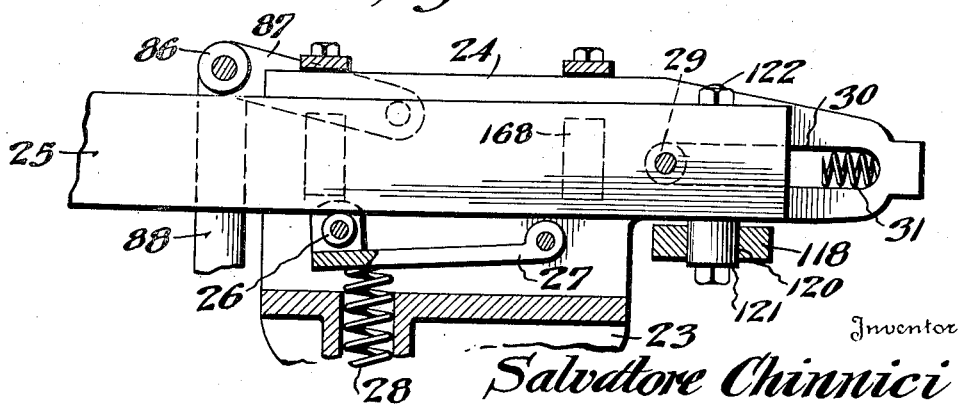
Fig. 20 is a broken fragmentary view partly in section through the iron mounting and supporting parts.
Figure 24:
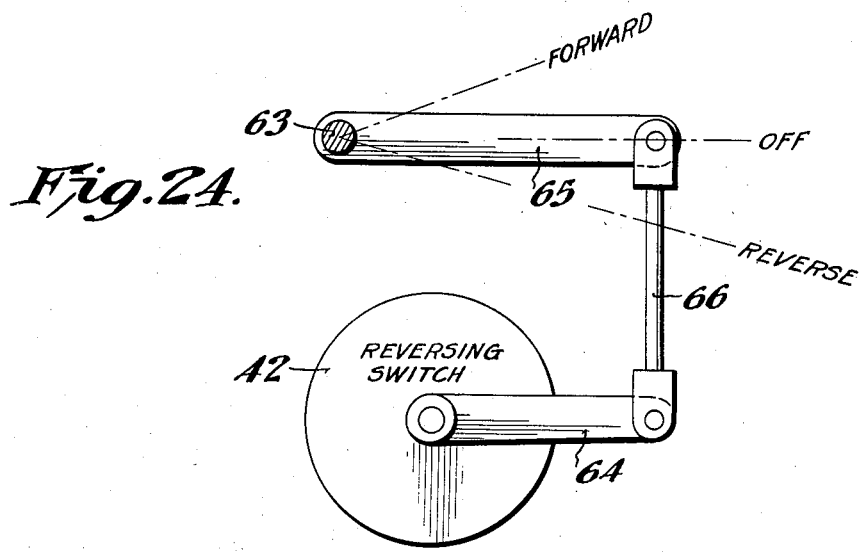
Fig. 24 is a fragmentary view to better show the switch operating mechanism.

A roller 86 Figs. 3, 19 and 20 is carried by the swinging ends of rocking links 87 so that it is disposed transversely across the pressing iron carrying arm 25, and a bifurcated yoke 88 straddles this arm 25 and is connected with the ends of the shaft carrying roller 86. A draw rod 89 connected with this yoke 88 is extended downwardly and is provided at its lower end with an adjustably connected bifurcated yoke 90 Fig. 4 which has a friction reducing roller 91 carried within the bifurcation thereof. By applying pressure upon the roller 91, the arm 25 will be swung downwardly, through the medium of link 89 and the associated parts, and it is desirable that this pulling force upon the draw rod or bar 89 be accomplished through force resultant from the travel of the carriage 14. However, as above stated, it is a primary purpose of my invention that pressure shall be applied through the pressing iron only while the iron is stationary. To accomplish the application of pressing pressure through movement of the carriage, it is therefore necessary that the movement of the iron be stopped and the movement of the carriage be continued until the proper force has been applied. With this purpose in mind, the bar 19 on the carriage 14 is made relatively movable, in the manner described above, so that movement of the carriage structure 14 can be stopped and movement of the bar 19, under propulsion of propelling shaft 41, can be continued until the proper pressure has been applied. To this end, the bar 19, which normally travels with the carriage 14, is associated with the main parts of the carriage to permit endwise movement of the bar, and it is desirable and essential that lock or latch and releasable means be provided, as best shown in Figs. 11 and 12, to normally hold the bar 19 against independent movement and to yet permit continued movement of this bar 19 when the pressing iron 11 has been brought to the end of its forward stroke, or in other words to the pressing position. The bar 19 has a notch or groove 92 in its upper edge adjacent to the forward edge of the body of the carriage 14, and a substantially L-shaped latch member 93 is pivotally and swingably mounted at 94 on the body of the carriage. An extension arm 95 is mounted on the carriage 14 to extend forwardly over the latch member 93, and a toggle link 96 swingably connected to extend upwardly from the latch member 93 has a roller 97 on the free end thereof to engage with this extension bar 95. A pressure spring 98 is mounted on the rear side of the toggle link 96 to normally exert resilient force to bring the roller 97 into bearing against the inner side of the extension bar 95, and thus the toggle link normally exerts force and pressure to move the latch member 93 downwardly to engage or hold in recess or notch 92, the latch member in this latched position then retaining the bar 19 and the carriage 14 in coupled relation to move together. A latch releasing trip bar 99 is carried by one of the cross bars 3, or some other suitable portion of the frame structure, in position to engage with the toggle link 96 when the carriage 14 has traveled to a point desired as the end of the forward movement, or in other words when the iron 11 has been carried to the desired limit of its forward movement over and above the pressing buck 5. This contact of the releasing trip bar 99 with the toggle link 96 releases the toggle link and exerts force to raise the latch member 93 from engagement in the recess or notch 92 of the bar 19, in consequence of which the carriage may stop while forward movement of the bar 19 is continued.

When the direction of rotation of the shaft 41 is reversed, to accomplish return movement of the carriage and the iron, the bar 19 will be moved rearwardly, or in the return path, and it is desirable that this return movement of bar 19 shall cause movement of the carriage 14 sufficiently to clear the latch releasing trip bar 99 so that the latch member 93 may again enter the notch or groove 92, and thus lock the carriage 14 to be moved with the bar 19. To this end I provide a spring 100 which is interposed between a portion of the carriage structure 14 and a stop portion 101 on the bar 19. Through means and mechanism to be hereinafter more fully described, pressing pressure is applied to the iron, and this pressing pressure is released by the independent forward and return movement of the bar 19 when released from the latch 93, and it will be appreciated that as the pressing pressure on the iron 11 is released and this iron rises from contact with the material on the pressing buck, the spring 100 will be sufficiently strong to move the carriage 14 a distance to clear the latch structure from the latch release bar 99, the latch 93 then engaging in the notch or groove 92 to lock the carriage positively to be carried rearwardly on its return movement by continued movement of the bar 19.

The application of pressing pressure upon the iron through the draw bar or link 89 is conveniently and positively and efficiently accomplished through the arrangement of parts as particularly shown in Fig. 4. A pressure bar 102 is pivotally or swingably mounted at 103 at one end of the frame, as best shown in Figure 1, and this bar extends substantially longitudinally of the frame to be guided in swinging movement at its free end by the guide members 104. The yoke or stirrup 90 has this pressure bar fitted therethrough so that the roller 91 is adjacent to the lower edge of the pressure bar 102, and consequently as the bar 102 has its free end swung downwardly, drawing force is exerted through link or draw bar 89 to swing down the iron carrying arm 25 and cause the pressing iron 11 to be clamped down to exert pressing pressure against and upon and over material held on the pressing buck or support 5. The position at which this pressing pressure is exerted upon the iron 11 is indicated by the dotted line showing of the iron 11 over the pressing buck 5 in Figure 1, and the operative position of the parts employed to accomplish substantially instantaneous and forceful pressing or clamping action through the bar 102 is illustrated in full lines in Fig. 4, the inoperative position of the bar 102, and the associated parts, being illustrated by dotted lines. Referring particularly to this disclosure, a rocking lever structure 105 is pivotally or swingably mounted at one end, as at 106, upon the supporting frame structure, the free end extending inwardly a distance sufficient to be substantially beneath the carriage 14 at the inner end of the travel of the carriage. Arms 107 are provided at the inner ends of the rocking lever structure 105 and adjustably support cam portions or rails 108. These cam portions or rails 108 are swingably mounted on the upright arms 107 to rise in inclined relation, and the inner ends of the cam rails 108 are adjustably held in elevated position by adjusting links 109 connected between the swinging ends of the cam rails and the rocking lever structure. A draw link 110 is connected with the rocking lever structure 105 adjacent to the pivotal mounting at 106, and at its other end this draw link 110 is connected with the pressure bar 102. With this construction and arrangement of the parts, assuming the elements to be in the position indicated by the dotted lines in Fig. 4, pressure exerted upon the inclined upper faces of the cam rails 108 will be considerably multiplied and increased in force as transmitted through the draw bar or link 110 to the pressure bar 102. As the pressure bar 102 is swung downwardly, it will be appreciated that pulling pressure is exerted upon draw link 89, and that consequently the pressing iron 11 is moved down to accomplish a considerable pressing pressure between the pressing faces of the iron 11 and the pressing buck 5. The bar 19 which is positively moved through the propelling shaft 41 and the arm 22, has a pressure arm 111 depending therefrom and provided at its lower end with a pressure roller 112, which pressure roller is positioned and disposed to ride up on the inclined upper faces of the cam rails 108. The mechanism as illustrated in Fig. 4 is so locked and so constructed and associated with the other parts that the full pressing pressure is applied by continued movement of bar 19 after the latch 93 has been released, so that when pressure is applied the iron 11 is stopped, and no movement of the iron is permitted or accomplished while the pressing force is being applied to the iron. Reversely, the arm 111 and the roller 112 travel rearwardly a sufficient distance to clear the roller from the cam rails 108, and consequently completely release the pressing pressure on the iron, before the latch 93 engages to couple the carriage 14 to be started on the return travel with the bar 19. To balance the action two cam rails 108 and rollers 112 can be provided, if desired.

It is of course essential that means be provided to stop rotation of the shaft 41 when the arm 111 has been carried sufficiently forward to depress the cam rails 108 and cause application of pressure upon the pressing iron through lowering of the bar 102, and associated parts, and this is readily accomplished by providing an arm 113, Fig. 27, extending radially from the main control shaft 63, which arm is disposed to be engaged by a portion of the cam rail structure 108 when this structure is depressed. This arm 113 can be fitted with an anti-friction roll, or can be otherwise constructed, and as the arm 113 is swung down the control shaft 63 is moved or oscillated to the neutral position so that the switch 42 is set in neutral to cut off the current to motor 40, and the brake 43 is applied to stop rotation of propelling shaft 41.

The parts will remain in the above described position as long as may be desired by the operator, and during this interval a tremendous pressing force is accomplished between the iron 11 and the pressing buck 5. Due however to the fact that the iron is entirely stationary or does not move laterally over the goods or material being pressed, and as the pressing force is applied throughout substantially the entire length of the seam being pressed, a uniform and smooth pressing action is accomplished at all points along the seam, and there is substantially no likelihood of production of shine, stretching or misplacement of the goods that might be accomplished by sliding or rolling or other movement of the iron during the pressing operation.

When it is desired to release this pressure and return the parts to the starting position, from an operating standpoint it is particularly advantageous to have the pressing iron 11 immediately and substantially instantaneously removed from proximity to the pressing buck 5, immediately following release of the pressing pressure upon the iron 11, and this result of complete and bodily removal of the iron 11 from proximity to the pressing buck 5, will be hereinafter more fully described. As the foot treadle 59 is operated from the neutral to the reversing position, the switch 42 is set for reverse operation of the motor 40, and brake 43 is released so that shaft 41 can be rotated to turn the threaded portion 44 thereof within the nut 45, in consequence of which the bar 19 is returned rearwardly, the latch 93 engaging in the groove or notch 92 to lock the carriage 14 to be moved with this bar 19 to the return position. When the carriage 14 is brought back or returned to the starting point, the roller 112 rides up on a lever or arm 114 to cause oscillation of the main control shaft 63 to bring this shaft to the neutral position, where the current through switch 42 to the motor 40 is cut off, and in which position the brake 43 is set to stop rotation of shaft 41. As the roller 112 moves from the cam rails 108, and prior to engagement of the latch 93 to cause movement of the carriage 14 and consequently of the pressing iron 11, spring 115 acts upon rocking lever structure 105 and consequently upon the pressure bar 102 to raise the parts to the dotted line position, where pulling pressure upon or through the draw bar or link 89 is entirely released, in consequence of which the spring 28 functions to swing the iron carrying bar 25 upwardly to raise the iron 11 out of pressing contact.

Immediately the pressure on the pressing iron 11 is released, the pressed garment or material is available for removal or readjustment for pressing another seam, and consequently if the operator should delay until the screw portion 44 of the propelling shaft 41 can move the carriage 14 a sufficient distance rearwardly to entirely clear the pressing iron 11 endwise from the pressing buck 5, quite an interval of time will be lost. It is to overcome this objection that I provide for substantially immediate lateral displacement of the pressing iron 11 just as soon as the pressure on the iron is released and the iron commences its return movement.

As has been stated, the pressing iron supporting bar 25 is endwise movable in the guide portion 24 of the support, and by moving the pressing iron supporting bar 25 endwise laterally, the pressing iron 11 will be carried therewith. To accomplish this purpose and end I mount a shaft 116 in suitable brackets 117 on the pressing iron supporting standard 23, preferably on the rear thereof, and provide on the ends of this shaft the iron control arm 118 and the control shifting arm 119. The iron control arm 118 has an elongated slot 120 through the swinging end thereof and an anti-friction roller 121 is carried on a pin 122 fixed in the arm 25 and is received and adapted to move in the elongated slot 120 of the arm 118. The control arm 119 has mounted at the swinging end thereof a shifting roller 123, and it will be seen that by actuating this arm 119, through pressure exerted upon the shifting roller 123, the arm 118 will be correspondingly swung and through engagement of the roller 121 in the slot 120 thereof the iron supporting bar 25 will be slid endwise in the support mounting at 24.

With the parts constructed in this way, pressure can be exerted on the outer side of shifting roller 123 to swing arm 118 and move the iron 11 to its forward or starting position, and if means be provided to engage the shifting roller to swing the arm 118 rearwardly, as the carriage 14 starts on its return movement, it will be appreciated that the iron supporting arm 25, and consequently the pressing iron 11, will be moved laterally with respect to the pressing buck and other parts. To accomplish this purpose I provide a fixed cam switch 124, perhaps best shown in Fig. 22, near the position occupied by the carriage 14 when returned to its starting position. This cam switch 124 is adapted to engage the shifting roller 123, when the roller travels in the position shown by the lower dotted indication, and to direct the shifting roller inwardly to come into close proximity with the rear face of the frame bar or member 2, when the carriage 14 is brought to the fully returned or starting position. This movement of the shifting roller 123 will swing arm 119, and consequently arm 118, to move the iron supporting bar 25 endwise forwardly to again return the iron 11 to its starting position.

As explained, during the forward travel the iron will remain in this position of vertical alignment above the pressing buck, and it is therefore necessary that some means be provided to swing arm 119, and consequently arm 118, to draw the iron supporting bar 25 endwise rearwardly, substantially immediately the pressure on the iron 11 is released, so that the iron will be bodily moved laterally to entirely clear the pressing buck 5 and the material supported thereon, to permit completely unobstructed handling or removal of the garment or seamed material, substantially instantaneously after completion of the pressing operation. With this purpose in mind, I provide a swinging switch frog member 125, pivotally mounted at 126 adjacent to the position occupied by the shifting roller 123 when the carriage and the iron are in the pressing position. This switch frog 125 is normally held in the full line position of Fig. 23 by spring 127, and the point of pivotal mounting at 126 is sufficiently spaced from the frame structure at 2 so that on its forward movement the shifting roller 123 can raise or push back the switch frog 125 and can pass freely. As return movement of the carriage 14 is initiated, the shifting roller 123 will travel up over the outer side of the switch frog member 125, held closed by the spring 127, and consequently arm 119 will be swung rearwardly. Arm 118 is correspondingly swung and through roller 121 slides the iron carrying bar 25 endwise rearwardly to thus bodily shift the pressing iron 11 laterally to completely and substantially instantaneously remove the iron from proximity to the pressing buck. It will be seen that when the roller 123 is in its rearward position of adjustment, the return cam member 124 will catch the roller on its return movement to restore the parts to the starting position.

Figure 25:
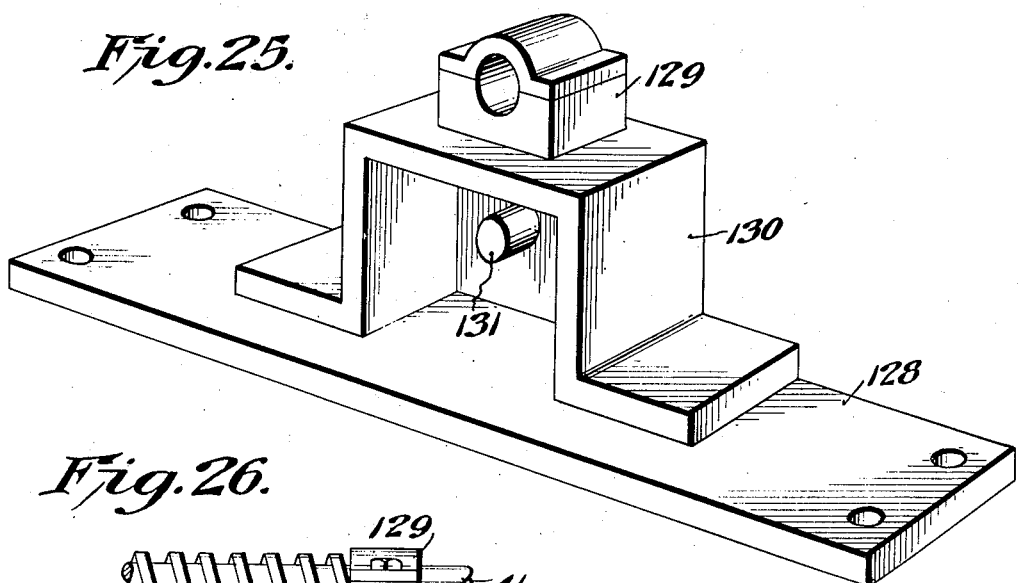
Fig. 25 is a detail perspective view illustrating one of the propelling shaft mountings.
Figure 26:
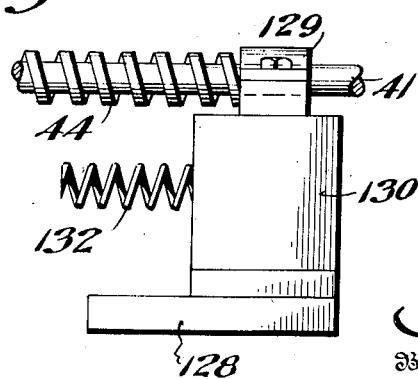
Fig. 26 is a fragmentary detail view showing the propelling shaft mounting.

It is essential that the shaft 41 be journalled or revoluby mounted to hold against springing or shifting within the frame, and yet the central screw threaded portion 44 must be entirely clear and unobstructed to permit free travel of the propelling nut 45. This mounting is conveniently accomplished by structure such as shown in Figs. 25 and 26 of the drawings. Cross frame supporting bars 128 are mounted on the frame structure adjacent to the two ends thereof, and journal boxes 129, or other suitable bearings, are provided to receive and revolubly mount the shaft 41. In the present instance I have shown these journal boxes or bearings 129 carried on bracket frames 130, which bracket frames have lugs 131 on their inner sides provided to mount and hold shock absorbing springs 132, which springs will be reversely contacted by opposite sides of a stop member 133, which stop member is carried by the propelling nut 45. These springs 132 are, of course, not intended to stop the travel of the carriage 14 or other moving parts, as this is accomplished through the mechanism hereinbefore set forth; but, the springs 132 will serve to ease and absorb the shocks of stopping the carriage 14 and the considerable weight of parts carried thereby, and will relieve the strain upon the propelling shaft 41, the propelling nut 45, and associated parts.

Figure 2:
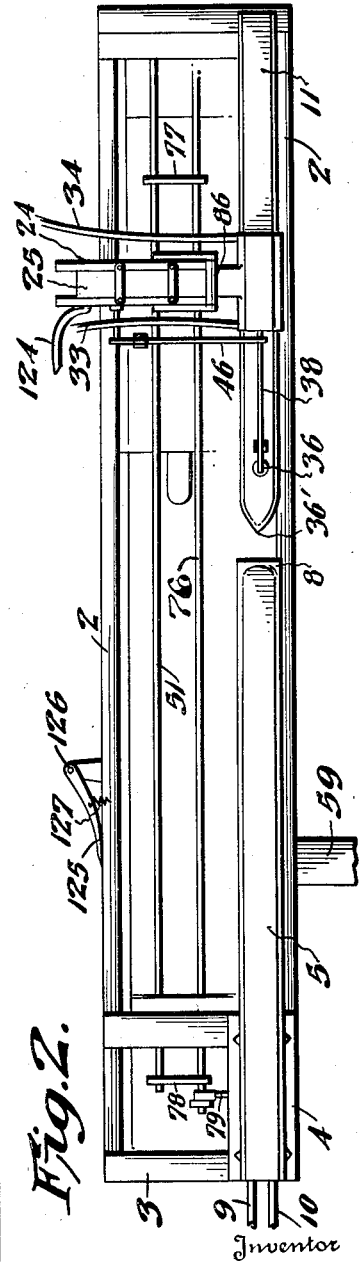
Fig. 2 is a top plan view of the disclosure in Figure 1.

As above set forth, the arm 113 operates main control shaft 63 as the carriage comes to the left hand end of the machine, as the parts are viewed in Figs. 1 and 2, or at the limit of forward movement of the carriage 14 and the pressing iron 11, and this arm or lever 113 is intended to function only at such time. Therefore, it is necessary that provision be made to loosely mount the arm of lever 113 on the main control shaft 63 so that full control and operation will not be interfered with or altered at other times. With this purpose in mind, the lever or arm 113 is loosely and swingably mounted on main control shaft 63, and a collar 134 fixed on this shaft has a stop or operating lug 135 thereon in position to be engaged by the arm 113 when swung during its operative interval.

Likewise, it is essential that the main control shaft 63 be free for movement independently of the lever or arm 114 which is contacted by roller 112 to throw the parts into neutral when the carriage and iron are returned to the starting position. To this end, an arm 136 is swingably mounted on main control shaft 63 and a collar 137 fixed on this shaft has a lug or stop 138 positioned to be engaged by the arm 136 when this arm is swung through actuated movement of the lever or arm 114. Springs 139 and 140 will be provided to hold the arms 113 and 114 in the inoperative relation, and the shaft 63 can then be readily and freely actuated through the use of the foot treadle 59 to be set for forward or reverse or neutral adjustments.

With the machine constructed in the manner set forth and operating as described, an operator can sit at a fixed position in front of the machine, adjacent to the pressing buck 5, and can handle and place and press and remove one seamed garment or piece of seamed material after another in rapid succession, especially as the pressing iron 11 is substantially immediately bodily removed from proximity to the pressing buck 5 upon completion of the pressing operation to thus leave the pressing buck free and unobstructed. Therefore, I find it convenient and advantageous to provide a seat for the operator, which seat will be conveniently mounted upon one of the frame members 2, as shown in Fig. 29. A mounting bracket 141, of substantially semicircular shape, is secured on the frame member 2 and a pin 142 swingably mounts a seat supporting standard 143 substantially centrally upon this semi-circular bracket portion. A plurality of adjusting openings 144 are provided in the bracket portion 141, in substantially circular or arcuate arrangement around the pivotal center at 142, and a pin 145 is fitted through an aligned opening in the seat supporting standard 143 and is adjustable in the openings 144 to hold the seat supporting standard 143 in any desired position of adjustment around the pivotal mounting at 142. The seat supporting standard 143 is inclined upwardly and outwardly to give sufficient clearance for the seat, indicated at 146, and which can be of any desired shape and construction. A seat supporting extension 147 is provided on the seat supporting standard 143, and this extension has a plurality of internally screw threaded openings 148 formed at spaced points throughout its length. A seat supporting plate 149 is carried at the upper end of an externally screw threaded seat supporting spindle 150, and the seat 146 is suitably mounted on this plate 149. By fitting the screw threaded supporting spindle in the openings 148, the proximity of the seat 146 to the frame structure, and consequently the position with respect to the pressing buck 5 can be adjusted. The spindle 150 affords means for adjusting the height of the seat, and the pin 145 and the openings 144 permit the seat supporting standard 143 to be adjusted to thus adjust the position of the seat relatively with respect to the length of the pressing buck.

With the modified construction shown in Figs. 30 and 31, the pressing iron 11' is carried on a bar 25', which bar is endwise slidably movable within the portion 24' at the top of the supporting standard 23'. This pressing iron supporting arm or bar 25' has a latch arm 151 extending upwardly therefrom, and a coil spring 152 fitted around guide rod 153 bears between this latch arm 151 and an arm 154 on the supporting standard structure 24'. With this construction and arrangement, the spring 152 normally exerts resilient force against the latch arm 151 to slide the iron carrying and supporting arm or bar 25' endwise rearwardly, and a latch member 155 is swingably mounted on the supporting bracket 154 and is provided with a keeper notch 156 to receive the latch arm 151 when the arm 25' is moved forwardly to substantially align the pressing iron 11' with the pressing buck, the latch member 155 thus holding latch arm 151 against the force and pressure exerted by spring 152. A trip arm 157 depending from latch member 155 has a roller 158 carried at its lower end in position to be engaged by a trip cam 159, which is spaced or located upon the frame structure at a point where it is desired that the latch 155 shall be tripped to permit bodily lateral movement of the pressing iron 11'. A roller 160 depends in fixed relation adjacent the rear end of the bar or arm 25', and a return cam track 161 is carried by a bracket 162 in position to contact this roller 160 to slide the arm or bar 25' endwise forwardly to restore or return the pressing iron 11' to its starting position forwardly. The latch 155 engages over the latch arm 151, and thus the arm is held to travel in its forwardmost position.

Under some conditions of operation and use it will be found desirable to advance the pressing iron 11 to substantially the position illustrated in Fig. 15, with the lower face of the iron spaced above the upper face of the pressing buck so that no pressure is exerted, as this permits the forward end 36' of the iron to enter between the seamed edges and to travel over the forward end of the pressing buck without catching or pressing the material at the nose of the buck 5. Then, it is desirable that the iron be lowered into contact with the goods or material being pressed, to hold the material or goods upon the pressing buck and prevent slipping, while the machine is stopped to permit adjustment and smoothing of belt loops, watch pockets and other parts, and when the movement of the iron is restarted. This lowering of the pressing iron is readily and conveniently accomplished through the pressure bar 102, by making the face thereof in two levels, as indicated at 163 and 164, with an incline 165 therebetween to permit free and smooth travel of the roller 91' from the one level to the other. Through this roller 91' and the yoke 90', force is exerted through draw bar or link 89' to swing the iron downwardly as may be desired. Toward the end of the forward movement, the parts will function substantially as set forth above to swing the pressure bar 102' and cause the iron to be drawn or forced down to accomplish the pressing pressure upon the seamed garment or material.

Due to the fact that the iron carrying bar 25 is not closely fitted within the portion 24 of the supporting standard 23, pressing iron 11 can have slight rocking movement from end to end, to thus allow adjustment for differences in thickness of the goods, or parts of a garment, as bunching at transverse seams and the like. Rollers 168 can be provided to reduce side friction as the bar 25 is moved endwise.

As illustrated in Fig. 18, the carrying rollers 15 and 16 for the carriage 14 can be provided with ball bearings, or other anti-friction bearings, as at 166, and the spindle 167 can be made adjustable to provide takeup, in the manner shown or in any other convenient construction.

Stops 169 can be provided at one or both ends, and on one or both track members, and these stops can be fitted with rubber bumpers or other shock absorbing means.

Since the operation and the functioning of the parts and the use of the various portions and mechanisms has been quite fully set forth in connection with the detailed description of the mechanism, it is thought that the purpose and operation and use will be fully understood.

This machine and mechanism is well adapted for carrying out the method of my invention, which method consists broadly in pressing a seam by opening out and smoothing back the edges of the material at the seam from the line of stitching, moistening the material substantially along the line of the seam, applying heat and direct pressure through stationary pressing means to press in a single operation and simultaneously substantially throughout the entire length of the opened and moistened seam, and then bodily removing and separating the pressing means to permit immediate manipulation and removal of the pressed garment or material.

From the foregoing description and the drawings it will be seen that I have provided a machine and method which permits the operator, while comfortably seated in convenient location before the machine, to have free use of both hands for adjusting, manipulating or holding the material or garment and for properly and expeditiously placing and locating the seamed portion, with which the pressing operation is accomplished by direct pressure simultaneously at all points throughout the length of the opened and moistened seam, and with which upon completion of the pressing operation the pressing means is bodily and substantially instantaneously removed laterally and separated from the pressing supporting means to thus permit free removal and adjustment of the garment or material being pressed, thus greatly increasing the efficiency of the machine and the operator, and saving time, labor and cost in the operation.

While I have herein shown and described only certain specific constructions and arrangements and embodiments of mechanism, and have set forth only certain possible steps and procedures in the method, it will of course be understood and appreciated that many changes and variations can be made to suit different requirements and conditions of use, without departing from the spirit and scope of this invention.

I claim:

1. A machine for pressing two-edged seamed material comprising, a support to receive and hold the seamed material with the seamed edges in available position, a heated pressing iron movably supported to travel in a line along the length of said support to progressively open and smooth back the edges of the material from the line of stitching to lie against the body of the material, means to apply moisture progressively along the line of the seam as the edges are opened and spread back by the iron, means to stop travel of said iron when the seamed material has been opened and smoothed and moistened, means to apply direct pressure to force the stopped iron against the material throughout the length of the moistened seam to thus dry and press the material, means to release the means applying pressure upon the iron, and means to move the iron bodily laterally from a position of proximity to the support to thus leave the pressed material freely available for instant and unobstructed movement upon and removal from the support.

2. A machine for pressing seamed material comprising, an elongated pressing buck having one end extending to receive and hold the seamed material to be pressed, an elongated pressing iron movable to travel substantially along the length of and above the pressing buck to progressively spread the seamed edges and smooth the same back from the line of seaming to lie against the body of the material, means to apply moisture along the line of the seam as opened and smoothed, means to stop travel of said iron in a position substantially over the opened and moistened seam, means to move the iron bodily toward the pressing buck to apply direct pressure to thus press the material, means to release the means applying pressure upon the iron to permit the iron to separate from the pressed material, means to move the iron bodily laterally to entirely clear the pressing buck to thus permit free and unobstructed adjustment and removal of the pressed material, and means to return the iron to the starting position and to restore the iron to substantial longitudinal alignment with the pressing buck.

3. A machine for pressing seamed material having two upwardly extending edges comprising, an elongated heated support having one end extending to receive and hold the seamed material with the edges presented uppermost, an elongated heated pressing iron movably mounted to travel above in a direct line along the length of and out of pressing contact with the support to but in contact with the upstanding edges to engage and spread and smooth back the seamed edges, means to stop travel of said iron when the seam has been opened, means to move said stopped heated iron downwardly against the material and upon the seamed area thereof as held by the support to press the material, means to bodily move the raised iron laterally from proximity to the support to permit free and unobstructed adjustment and removal of the material, and means to move and restore said iron to the original starting position for subsequent operations.

4. A machine for pressing seamed material such as the seams in trouser legs and the like comprising, an elongated supporting buck having one end extending to receive and hold the seamed material with the seamed edges disposed upwardly and extending substantially longitudinally of the support, a carriage movable in a direction substantially longitudinally of the pressing buck, an elongated pressing iron movably mounted on said carriage, means to hold said pressing iron upon said carriage during the forward travel thereof in position to spread and open out and smooth back the seamed edges of the material to lie against the body of the material, means associated with the iron to apply moist steam along the line of the seam during the opening step, means to stop travel of said carriage when the seam has been opened and moistened, means to move said iron bodily downwardly to accomplish direct pressing force of the stopped iron against the material over the opened seam as supported by the pressing buck to thus dry and press the material, means operable to release the pressure applying means from the iron, means to raise the iron bodily from pressing contact with the material, means to bodily move said iron laterally from proximity to the pressing buck to thus permit free and unobstructed adjustment and removal and replacement of material, means to move said carriage to the starting position, and means to move the iron to a position for commencement of another cycle of operation.

5. A machine for pressing seamed material comprising, an elongated stationary heated supporting buck having one end extending to receive and hold the material to be pressed and to support the same with a two-edged seam uppermost and longitudinally disposed, an elongated pressing iron movable longitudinally of and in proximity to the upper face of said supporting buck substantially in line with the direction of extent of the seam, means to move said iron along the length of the seam to spread and open out the edges of the seamed material and smooth said edges down upon the body of material on opposite sides of the line of stitching, means to stop the iron, means associated with said iron to moisten the material along the line of stitching progressively as the iron travels to spread the seamed edges and to stop application of moisture when the iron is stopped, means to apply direct pressure to press the opened and moistened seamed material between the heated support and the heated iron, means to raise said iron from the pressing position to clear the material, and means to bodily move said pressing iron laterally from proximity to the support to thus permit free manipulation and adjustment and removal of the pressed material.

6. A machine for pressing seamed material comprising, a heated elongated stationary supporting buck to receive and hold the material to be pressed and to support the same with a two-edged seam uppermost and longitudinally disposed, an elongated heated iron movable longitudinally in line with the direction of the extent of the seam, means to move said iron along the length of the seam with a pressure insufficient for finished pressing to open and spread the edges of the seam and smooth the same down upon the body of the material on opposite sides of the line of stitching as the iron is moved, means to supply heat to said iron, means to supply heat to the supporting buck, means associated with said iron to moisten the material along the line of stitching as the iron travels and spreads the seamed edges, means to stop the moistening operation, means to force the iron downwardly to press in a single operation along the entire length of the seam as moistened, means to release the means applying pressing force upon the iron, means to move said iron bodily laterally from proximity to the supporting buck, and means to set the mechanism to operate to return the iron to the starting position.

7. A machine for pressing seamed material comprising, an elongated supporting buck to receive and hold the seamed material with the edges of the seam extending longitudinally thereof and presented upwardly, an elongated hollow iron movable longitudinally of and above the buck and thus substantially in line with the line of stitching of the seamed material supported thereon and also movable upwardly and downwardly away from and toward said support, means to move said iron in forward seam opening travel along the length of said support to enter between the edges of the seamed material to open the seam and smooth back said edges without applying finishing pressing force, means to supply moisture through the forward end of the pressing face of said iron during the forward travel to thus moisten the material along the line of stitching as the seam is opened, means to stop the forward travel of the iron upon completion of the seam opening movement, means to stop the supply of moisture, means to supply steam to said hollow iron to heat the iron, means to move said iron toward the support to apply pressure to clamp the stopped iron tightly against the opened seamed material as held by the support, means to raise said iron from the pressing position, and means to move the raised iron bodily laterally to a position completely separated from the supporting buck to allow adjustment and removal of the pressed material.

8. A machine for pressing seamed material comprising, an elongated support to receive and hold the seamed material with the edges of the seam extending longitudinally thereof and presented upwardly, an elongated iron movable longitudinally of the support and thus substantially along and over the line of stitching of the seamed material supported thereon and also movable upwardly and downwardly away from and toward said support, said iron when in the position raised from the support being bodily movable rearwardly to entirely clear and separate from said support, means to move said iron in forward seam opening travel longitudinally of said support to enter between the edges of the seamed material to open the seam and smooth back said edges without applying pressing force, means to supply moisture during the forward travel of the iron to thus moisten the material along the line of stitching as the seam is opened, means to cut off the supply of moisture when the iron has reached its full forward travel, means to stop the forward travel of the iron upon completion of the seam opening movement, means to apply direct pressure to clamp the stopped iron tightly against the opened seam of the material as held by the support, means to release the pressure applying means, means to move the released iron bodily laterally to allow unrestricted adjustment and removal of the pressed material, and means to set the mechanism to operate to return the iron to the starting position following completion of the pressing operation and release of the pressure.

9. A machine for pressing seamed material comprising, an elongated support to receive and hold the material to be pressed, an elongated steam heated iron provided with steam escape passages through the forward end of the pressing face, a steam supply connection to said iron, means to move said iron forward longitudinally slightly above the support and to stop the forward movement when said iron has traversed the length of the seamed portion to be pressed, means to open the steam escape passages at the beginning of the forward movement of the iron along the length of the seam and to close said passages at the advanced end of the forward movement, means to move the stopped iron into pressing relation to the length of the seamed portion as steamed, and means to move said iron bodily laterally to be entirely separated and spaced from the elongated support following pressing of the seam.

10. A machine for pressing seamed material comprising, an elongated support to receive and hold the material to be pressed, an elongated hollow iron having steam escape passages through the pressing face adjacent to its forward end, a steam supply connection to said iron, means to move said iron forwardly longitudinally slightly above the support to spread and smooth down the seamed edges of seamed material held on the elongated support, means to open the steam escape passages at commencement of the forward movement of the iron and to close said passages at the advanced end of the forward movement, means to stop forward movement of said iron when the iron has moved to a position to bring its length above said support, means to move the stopped iron bodily downwardly into pressing relation to exert direct pressure upon the material held by the support after forward movement of the iron is stopped, means to release the means applying pressing force upon the iron, means to move the released iron bodily laterally to separate the iron from proximity to the elongated support, means to set the operating parts to move the rearwardly disposed iron longitudinally to near the starting position, and means to move the iron forwardly to return the same to the starting position.

11. A machine for pressing seamed material comprising, a supporting frame structure, an elongated work supporting buck carried at one end of the frame with one end thereof extending to conveniently receive and hold a seamed member such as a trousers leg to be pressed with the seam disposed outermost and extending along the length of the supporting buck, a carriage movably mounted on said frame to travel in a line parallel with the length of the work support, an elongated iron mounted on and movable with said carriage at an elevation above the work support and independently movable to raised and lowered positions and to a position rearwardly out of alignment with the elongated work support, screw means to move said carriage longitudinally to carry the iron longitudinally along the length of the seam to open and spread back the seamed edges of the material, means to stop movement of the iron when the desired length of the seam has been opened and the edges have been smoothed back, means to bodily lower and to press the iron to bring the same into pressing relation upon the seamed material carried by the supporting buck, means to release the pressure applying means, means to bodily move the iron upon the carriage to travel laterally into a position spaced from the supporting buck, means to reverse actuation of the screw to return the carriage to the starting position, and means to move the iron forwardly upon the carriage to return the same to the starting position.

12. A machine for pressing seamed material comprising, an elongated supporting frame, an elongated work support carried at one end of the frame and having a portion thereof extending to receive and hold seamed material such as a trousers leg with the seam uppermost and extending longitudinally of the elongated support, a carriage movably mounted on said frame and capable of travel in a line parallel with the longitudinal extent of the frame and consequently of the work support, an elongated iron bodily carried and movable with said carriage, said iron being also mounted for movement laterally of said support and upwardly and downwardly upon said carriage, means to move said carriage longitudinally on the frame to thus carry the iron longitudinally over the work support and in a line substantially along the seam of the material on said work support, said iron being shaped to enter between the edges of the seamed material to open and smooth down said edges, means to stop movement of the carriage when the iron has traversed the length of the seam desired to be opened and smoothed, means to bodily lower said iron to clamp and press the opened and smoothed seamed material upon the work support, means to raise the iron, means to move the raised iron upon the carriage bodily laterally from said support to separate the iron from proximity to the work support to thus leave the material entirely free for readjustment and removal and replacement upon the work support, means to adjust the parts to return said carriage to the starting position, and means to move said pressing iron upon the carriage to return the iron to the starting position.

13. A machine for pressing seamed material comprising, an elongated supporting frame, supporting trackways extending and carried longitudinally in substantially horizontal relation on said supporting frame, an elongated pressing buck fixedly mounted at one end of the supporting frame to thus lie with its long dimension substantially parallel with the extent of said supporting trackways and having one end thereof extending to receive and support a seamed part of material such as a trousers leg, a carriage movably mounted to be capable of movement in a line with the longitudinal extent of the supporting trackways, a heated pressing iron movably mounted upon the carriage in a line substantially parallel with the longitudinal extent of said elongated pressing buck, means to move said carriage longitudinally to carry the pressing iron substantially along the line of the seamed material to thus open and spread back the seamed edges and smooth the same down upon the body portion of the material, means to supply moisture substantially along the line of the seam during the opening and smoothing travel of the iron, means to stop movement of the iron when the desired length of the seam has been opened in which stopped position the iron extends substantially longitudinally of and directly over the opened seam, means to stop the supply of moisture, means to supply heat to the iron, means to move the iron bodily downwardly to exert pressing force through the iron upon the opened and moistened seam, means to raise said iron from the pressing position, means to bodily move the iron upon the carriage laterally from said buck to a position entirely separated from the elongated pressing buck, means to set the operating parts to function to return the carriage to the starting position, and means to move the iron forwardly to again assume a position proper for commencement of another seam opening and moistening and pressing operation.

14. A machine for pressing seamed material such as the leg seams in the legs of trousers and the like comprising, an elongated supporting and base frame, trackways carried upon said frame and extending longitudinally in a substantially horizontal plane, an elongated work supporting pressing buck fixedly mounted at one end on said frame and having a portion thereof extending longitudinally back over the supporting frame and separated therefrom to permit ready placement of a seamed trousers leg and like garment upon the supporting buck with the seamed edges outermost and the line of the seam extending substantially longitudinally of the pressing buck, a carriage movable upon said trackways, an elongated pressing iron mounted upon said carriage at an elevation above the pressing buck and so mounted that the iron is capable of movement upwardly and downwardly and bodily rearwardly and forwardly, said iron having openings through the pressing face thereof adjacent to its forward end, a steam supply connection to the body of said iron to heat the same and to said openings to supply steam through the openings to moisten the seamed material, a propelling worm rotatably mounted on the supporting frame adjacent to the trackways, means on said carriage interacting with said worm to propel said carriage along the trackways as said worm is rotated, reversible means to rotate said worm to accomplish forward and return travel of said carriage upon the trackways, control means to initiate rotation of the worm to propel said carriage forwardly with the elongated iron traveling substantially along the length of the seamed material carried on the supporting buck to open and spread back the edges of the material from the line of seaming and against the body of the material, means to open the supply of steam through the openings of the iron to moisten along the line of the seam, means to stop movement of the carriage and consequently stop movement of the iron when the desired length of the seam has been opened and smoothed back, means to stop the supply of steam to discontinue moistening of the material, means to move said iron downwardly and clamp the same to exert static pressing force in a single operation against substantially the entire length of the seam as opened and moistened, means to release the means applying pressure on the iron, means to move said iron upon the carriage bodily laterally from said buck to separate the iron from proximity to the supporting buck to thus permit unrestricted manipulation and removal and replacement of the material being pressed, manually actuatable means to initiate operation of the worm to return the carriage to the starting position, and means to return said pressing iron to a starting position when the carriage reaches its starting position.

SALVATORE CHINNICI.